(12) United States Patent  (10) Patent No.: US 11,248,926 B2
Wakayanagi et al.  (45) Date of Patent: Feb. 15, 2022

(54) DISPLAY CONTROL DEVICE AND DISPLAY CONTROL METHOD

(71) Applicant: MITSUBISHI ELECTRIC CORPORATION, Tokyo (JP)

(72) Inventors: Haruhiko Wakayanagi, Tokyo (JP); Mitsuo Shimotani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 305 days.

(21) Appl. No.: 16/490,322

(22) PCT Filed: May 16, 2017

(86) PCT No.: PCT/JP2017/018364
§ 371 (c)(1),
(2) Date: Aug. 30, 2019

(87) PCT Pub. No.: WO2018/211591
PCT Pub. Date: Nov. 22, 2018

(65) Prior Publication Data
US 2020/0400455 A1  Dec. 24, 2020

(51) Int. Cl.
*G01C 21/36* (2006.01)
*B60W 50/14* (2020.01)
(Continued)

(52) U.S. Cl.
CPC ........... *G01C 21/365* (2013.01); *B60W 50/14* (2013.01); *G09G 3/002* (2013.01); *G09G 5/026* (2013.01); *G09G 2380/10* (2013.01)

(58) Field of Classification Search
CPC ..... G01C 21/365; B60W 50/14; G09G 3/002; G09G 5/026
(Continued)

(56) References Cited

U.S. PATENT DOCUMENTS

2007/0013495 A1  1/2007 Suzuki et al.
2010/0223002 A1*  9/2010 Oonichi ............. G01C 21/3658
  701/533
(Continued)

FOREIGN PATENT DOCUMENTS

JP  2000-211452 A  8/2000
JP  2004-317138 A  11/2004
(Continued)

OTHER PUBLICATIONS

Office Action dated Jun. 2, 2020 in corresponding Japanese Application No. 2019-518636 with an English Translation.
(Continued)

*Primary Examiner* — Kerri L McNally
(74) *Attorney, Agent, or Firm* — Birch, Stewart, Kolasch & Birch, LLP

(57) ABSTRACT

A display control device for controlling a display device displaying a driver support image to have an overlap with a view from a driver seat in a vehicle or a live-action video in front of the vehicle, the display control device includes: a video signal generation unit generating a video signal for displaying a driver support image to have an overlap with the travelable traffic lane, and a video signal output unit. The driver support image having the overlap with the travelable traffic lane has a width in a width direction of the traffic lane and extends in a direction in which the traffic lane extends. The driver support image having the overlap with the region other than the travelable traffic lane is an image in which the travelable traffic lane can be distinguished according to a width and a length.

14 Claims, 12 Drawing Sheets

(51) Int. Cl.
*G09G 3/00* (2006.01)
*G09G 5/02* (2006.01)

(58) Field of Classification Search
USPC .................................................. 340/435
See application file for complete search history.

(56) References Cited

U.S. PATENT DOCUMENTS

| | | | |
|---|---|---|---|
| 2012/0191344 A1* | 7/2012 | Iao | G01C 21/3658 701/436 |
| 2012/0259546 A1 | 10/2012 | Kim | |
| 2014/0063044 A1* | 3/2014 | Kim | G01C 21/367 345/592 |
| 2014/0163878 A1* | 6/2014 | Asano | G01C 21/3658 701/533 |
| 2016/0252363 A1* | 9/2016 | Tertoolen | G01C 21/3676 701/410 |
| 2016/0341561 A1* | 11/2016 | Woolley | G01C 21/3658 |
| 2017/0039438 A1 | 2/2017 | Homma | |
| 2017/0120819 A1 | 5/2017 | Arita et al. | |

FOREIGN PATENT DOCUMENTS

| | | |
|---|---|---|
| JP | 2005-78414 A | 3/2005 |
| JP | 2006-162442 A | 6/2006 |
| JP | 2006-350617 A | 12/2006 |
| JP | 2010-38625 A | 2/2010 |
| JP | 2012-220489 A | 11/2012 |
| JP | 2014-181927 A | 9/2014 |
| JP | 2015-60300 A | 3/2015 |
| JP | 2015-210644 A | 11/2015 |
| JP | 2016-21116 A | 2/2016 |
| JP | 2017-53678 A | 3/2017 |
| WO | WO 2013/080310 A1 | 6/2013 |
| WO | WO 2015/186326 A1 | 12/2015 |
| WO | WO 2016/051447 A1 | 4/2016 |
| WO | WO 2018/207308 A1 | 11/2018 |

OTHER PUBLICATIONS

International Search Report (PCT/ISA/210) issued in PCT/JP2017/018364, dated Aug. 22, 2017.
Office Action dated Dec. 8, 2020 in Japanese Application No. 2019-518636 with an English Translation.

\* cited by examiner

DISPLAY CONTROL DEVICE AND DISPLAY CONTROL METHOD

TECHNICAL FIELD

The present invention relates to a display control device and a display control method.

BACKGROUND ART

Known is a technique of displaying an arrow indicating a movement of a vehicle going straight, turning right, and turning left, using a head up display (HUD), for example, so that a navigation device of the vehicle makes a driver recognize a route in advance. Also known is a technique of displaying an image to have an overlap with a view from a driver seat in the vehicle, thereby making a driver recognize a route in advance (refer to Patent Documents 1 to 4, for example).

PRIOR ART DOCUMENTS

Patent Documents

Patent Document 1: Japanese Patent Application Laid-Open No. 2012-220489
Patent Document 2: Japanese Patent Application Laid-Open No. 2006-350617
Patent Document 3: Japanese Patent Application Laid-Open No. 2014-181927
Patent Document 4: Japanese Patent Application Laid-Open No. 2000-211452

SUMMARY

Problem to be Solved by the Invention

However, in a case where there are many traffic lanes in a road or there is a complex branch in an intersection, for example, a driver of a vehicle may be at a loss which traffic lane to travel in some cases. In a road with no lane edge line, for example, a driver of a vehicle may be at a loss whether the driver can travel along the road in some cases.

When the driver of the vehicle is at a loss for the determination of a course and takes a wrong route, there is a problem that energy for driving the vehicle is wasted to return the vehicle to a correct route. Accordingly, there is increasing demand for making the driver recognize more reliably the travelable traffic lane along which the driver can travel.

The present invention has been achieved to solve problems as described above, and it is an object of the present invention to provide a display control device and a display control method controlling a display device, thereby making a driver recognize a travelable traffic lane.

Means to Solve the Problem

A display control device according to the present invention is a display control device which controls a display device displaying a driver support image to have an overlap with a view from a driver seat in a vehicle or a live-action video in front of the vehicle. The display control device includes a vehicle position acquisition unit acquiring a current position of the vehicle, a feature data acquisition unit acquiring feature data regarding a road in front of the vehicle, a travelable traffic lane determination unit determining a travelable traffic lane along which the vehicle can travel in the road in front of the vehicle based on the current position of the vehicle and the feature data, a video signal generation unit generating a video signal for displaying the driver support image to have an overlap with the travelable traffic lane or a video signal for displaying the driver support image to have an overlap with a region other than the travelable traffic lane, and a video signal output unit outputting the video signal to the display device. The driver support image having the overlap with the travelable traffic lane has a width in a width direction of the traffic lane and extends in a direction in which the traffic lane extends. The driver support image having the overlap with the region other than the travelable traffic lane is an image in which the travelable traffic lane can be distinguished according to a width and a length.

A display control method according to the present invention is a display control method of controlling a display device which displays a driver support image to have an overlap with a view from a driver seat in a vehicle or a live-action video in front of the vehicle. The display control method includes acquiring a current position of the vehicle, acquiring feature data regarding a road in front of the vehicle, determining a travelable traffic lane along which the vehicle can travel in the road in front of the vehicle based on the current position of the vehicle and the feature data, generating a video signal for displaying the driver support image to have an overlap with the travelable traffic lane or a video signal for displaying the driver support image to have an overlap with a region other than the travelable traffic lane, and outputting the video signal to the display device. The driver support image having the overlap with the travelable traffic lane has a width in a width direction of the traffic lane and extends in a direction in which the traffic lane extends. The driver support image having the overlap with the region other than the travelable traffic lane is an image in which the travelable traffic lane can be distinguished according to a width and a length.

Effects of the Invention

According to the display control device and the display control method in the present invention, the driver support image is displayed to have the overlap with the travelable traffic lane in the view from the driver seat in the vehicle or the live-action video in front of the vehicle, thus the driver can effectively recognize the travelable traffic lane. Moreover, the driver support image is displayed to have the overlap with the region other than the travelable traffic lane in the view from the driver seat in the vehicle or the live-action video in front of the vehicle, thus the driver can effectively recognize the travelable traffic lane. The display of the driver support image suppresses a deviation of the vehicle from a correct route, thus energy wasted to return the vehicle to the correct route can be suppressed.

According to the display control device and the display control method in the present invention, the driver support image having the overlap with the travelable traffic lane has the width in the width direction of the traffic lane and extends in the direction in which the traffic lane extends, thus visibility of the driver support image can be increased.

These and other objects, features, aspects and advantages of the present invention will become more apparent from the following detailed description of the present invention when taken in conjunction with the accompanying drawings.

DESCRIPTION OF EMBODIMENT(S)

Embodiment 1

<Configuration>

Figure 1:
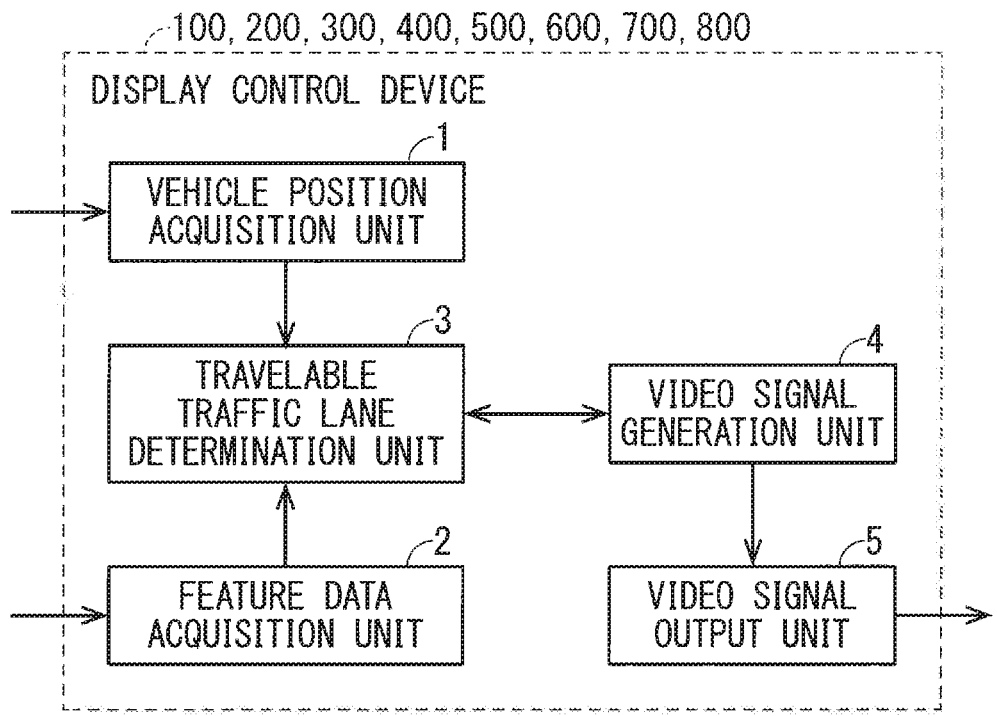
FIG. 1 A block diagram of a display control device according to an embodiment 1.

FIG. 1 is a block diagram of a display control device 100 in a present embodiment 1. As illustrated in FIG. 1, the display control device 100 includes a vehicle position acquisition unit 1, a feature data acquisition unit 2, a travelable traffic lane determination unit 3, a video signal generation unit 4, and a video signal output unit 5.

The display control device 100 controls a display device displaying a driver support image to have an overlap with a view from a driver seat in a vehicle. Herein, the display device 100 is a display device displaying a video through a windshield of the vehicle, and is an HUD, for example. In the present specification, a vehicle with a display device controlled by the display control device 100 is simply referred to as a "vehicle".

The vehicle position acquisition unit 1 acquires a current position of the vehicle. The feature data acquisition unit 2 acquires feature data regarding a road. The travelable traffic lane determination unit 3 determines a travelable traffic lane along which the vehicle can travel in a road in front of the vehicle based on the current position of the vehicle and the feature data.

The video signal generation unit 4 generates a video signal displayed by the display device. The video signal displayed by the display device is a video signal for displaying the driver support image to have an overlap with the travelable traffic lane. The video signal output unit 5 outputs a video signal to the display device.

In the present embodiment 1, the driver support image having the overlap with the travelable traffic lane is an image having a width in a width direction of the traffic lane and extending in a direction in which the traffic lane extends.

Figure 2:
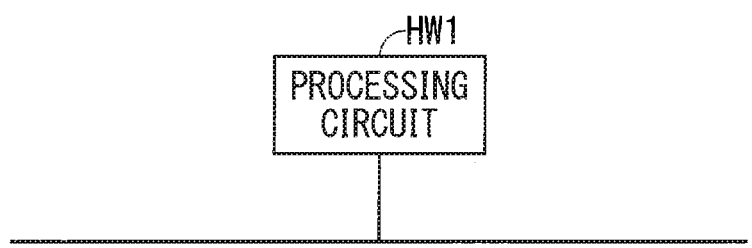
FIG. 2 A hardware configuration diagram of the display control device according to the embodiment 1.

FIG. 2 is a hardware configuration diagram of the display control device 100. A processing circuit HW1 achieves each function of the vehicle position acquisition unit 1, the feature data acquisition unit 2, the travelable traffic lane determination unit 3, the video signal generation unit 4, and the video signal output unit 5 in the display control device 100. That is to say, the display control device 100 includes a processing device for performing processing of acquiring the current position of the vehicle, acquiring the feature data regarding the road, determining the available traffic lane along which the vehicle can travel in the road in front of the vehicle based on the current position of the vehicle and the feature data, generating the video signal for displaying the driver support image to have the overlap with the travelable traffic lane, and outputting the video signal to the display device. A processing circuit HW2 may be dedicated hardware or a CPU (also referred to as a Central Processing Unit, a processing device, an arithmetic device, a microprocessor, a microcomputer, a processor, and a digital signal processor (DSP)) for executing a program stored in a memory.

When the processing circuit HW1 is the dedicated hardware, a single circuit, a complex circuit, a programmed processor, a parallel-programmed processor, an application specific integrated circuit (ASIC), a field programmable gate array (FPGA), or a circuit combining them, for example, falls under the processing circuit HW1. The processing circuit may achieve each function of the vehicle position acquisition unit 1, the feature data acquisition unit 2, the travelable traffic lane determination unit 3, the video signal generation unit 4, and the video signal output unit 5, and one processing circuit may collectively achieve the function of each unit.

When the processing circuit HW1 is a processor, each function of the vehicle position acquisition unit 1, the feature data acquisition unit 2, the travelable traffic lane determination unit 3, the video signal generation unit 4, and the video signal output unit 5 is achieved by a combination of software (software, firmware, or a combination of software and firmware), for example. The software, for example, is described as a program and is stored in a memory HW3. The processor HW2 applied to the processing circuit HW1 reads out and executes the program stored in the memory HW3, thereby achieving the function of each unit. That is to say, the display control device 100 includes the memory HW3 for storing programs to resultingly execute, when executed by the processing circuit HW1, a step of acquiring the current position of the vehicle, a step of acquiring the feature data regarding the road, a step of determining the travelable traffic lane along which the vehicle can travel in the road in front of the vehicle based on the current position of the vehicle and the feature data, a step of generating the video signal for displaying the driver support image to have the overlap with the travelable traffic lane, and a step of outputting the video signal to the display device. These programs are deemed to make the computer execute a procedure or a method of the vehicle position acquisition unit 1, the feature data acquisition unit 2, the travelable traffic lane determination unit 3, the video signal generation unit 4, and the video signal output unit 5. Herein, the memory HW3 may be a non-volatile or volatile semiconductor memory such as a random access memory (RAM), a read only memory (ROM), a flash memory, an erasable programmable read only memory (EPROM), or an electrically erasable programmable read-only memory (EEPROM), a magnetic disc, a flexible disc, an optical disc, a compact disc, a mini disc, or a digital versatile disc (DVD), for example, or any storage medium which will be used in the future.

It is also applicable to achieve a part of the function of the vehicle position acquisition unit 1, the feature data acquisition unit 2, the travelable traffic lane determination unit 3, the video signal generation unit 4, and the video signal output unit 5 by dedicated hardware and achieve another part thereof by software or firmware. As described above, the processing circuit HW1 can achieve each function described above by hardware, software, firmware, or a combination thereof.

<Operation>

Figure 4:
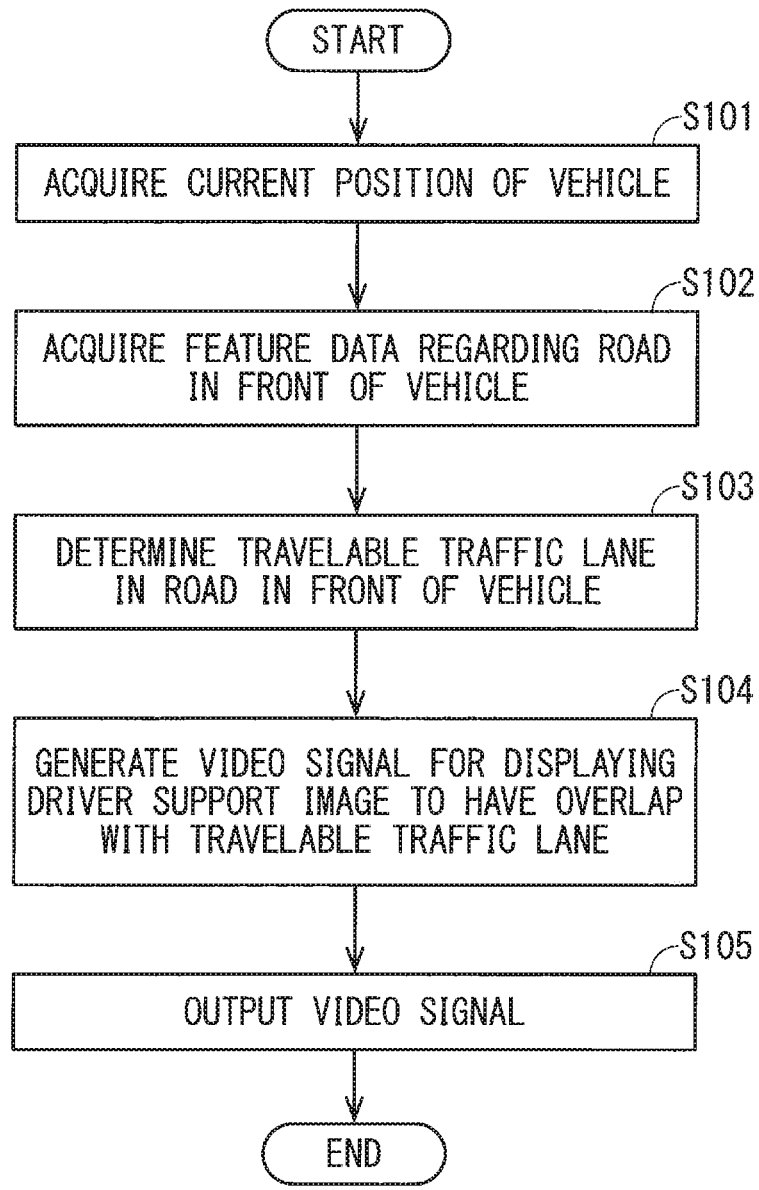
FIG. 4 A flow chart illustrating an operation of the display control device according to the embodiment 1.
Figure 5:
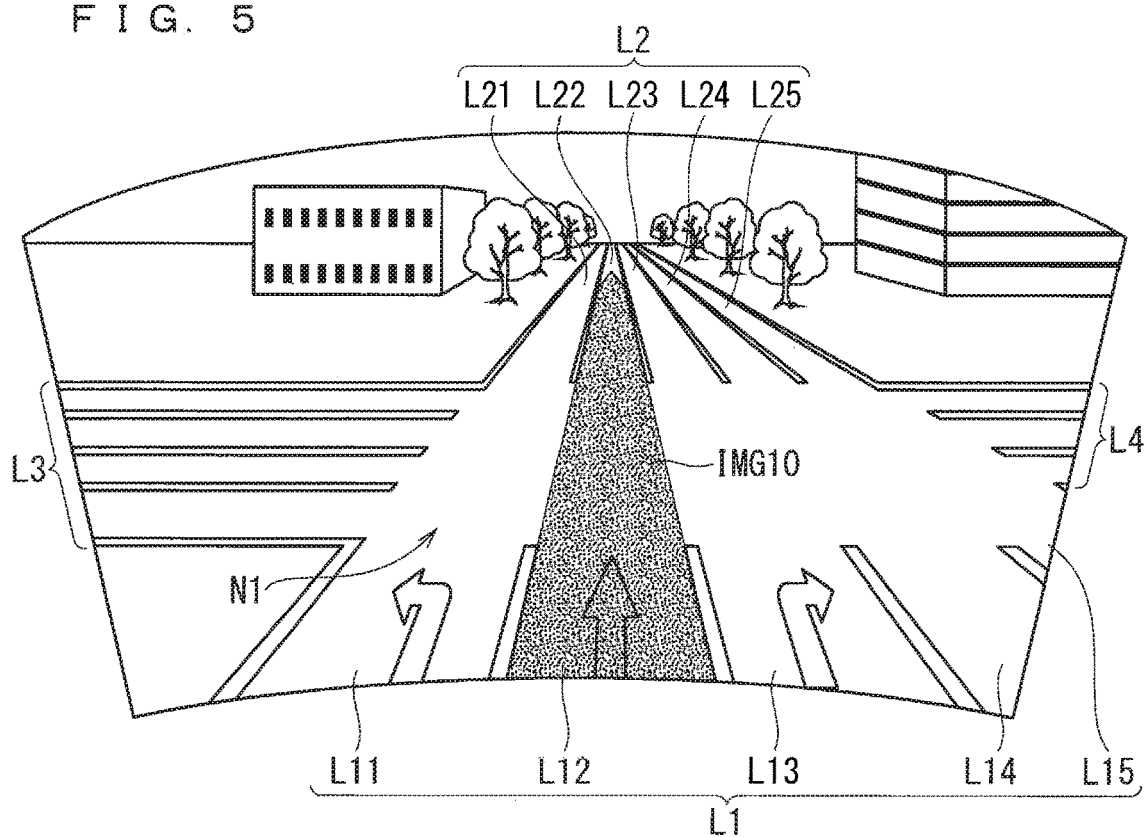
FIG. 5 A pattern diagram illustrating an example of a driver support image which the display control device according to the embodiment 1 makes a display device display and a view from a driver seat in a vehicle.

FIG. 4 is a flow chart illustrating an operation of the display control device 100 in the present embodiment 1. FIG. 5 is a pattern diagram illustrating an example of the driver support image which the display control device 100 makes the display device display and a view from a driver seat in a vehicle. FIG. 5 is a pattern diagram, thus the illustration of a signal, a stop line, a sidewalk, and a crosswalk, for example, is omitted.

As illustrated in FIG. 5, assumed is a state where roads L1, L2, L3, and L4 are connected to an intersection N1. Herein, the intersection is also referred to as a node. A road connecting intersections is also referred to as a link. The road L1 includes traffic lanes L11 to L15. The traffic lanes L11, L12, and L13 are traffic lanes extending in a traveling direction of the vehicle, and the traffic lanes L14 and L15 are opposite traffic lanes. The road L2 includes traffic lanes L21 to L25. The traffic lanes L21, L22, and L23 are traffic lanes extending in the traveling direction of the vehicle, and the traffic lanes L24 and L25 are opposite traffic lanes. The vehicle travels along the traffic lane L12 along which the vehicle can only go straight in the road L1 illustrated in FIG. 5.

Firstly, the vehicle position acquisition unit 1 acquires a current position of the vehicle (Step S101). The current position of the vehicle is calculated using information obtained from a global positioning system (GPS), a sensor mounted on the vehicle, and a camera mounted on the vehicle, for example.

Next, the feature data acquisition unit 2 acquires feature data regarding a road in front of the vehicle (Step S102). Herein, the road in front of the vehicle in FIG. 5 indicates the road L1 along which the vehicle currently travels and the roads L2, L3, and L4 connected to the road L1 via the intersection N1. The feature data regarding the road includes information regarding, for example, a link length, a road width classification, the number of traffic lanes, a traffic lane width, a road crossing, a division line for dividing each traffic lane, a traveling direction of each traffic lane (right turn lane, left turn lane, and straight lane), for example. The feature data acquisition unit 2 may acquire the feature data regarding the road by communicating with a server device storing the feature data or may acquire the feature data regarding the road from a database mounted on the vehicle.

A camera acquiring a live-action video in front of the vehicle may be mounted on the vehicle. The feature data acquisition unit 2 may acquire the feature data regarding the road by analyzing the live-action video in front of the vehicle. The analysis of the live-action video indicates, for example, an operation of recognizing a traffic lane based on a detection of a road sign including a white line.

Next, the travelable traffic lane determination unit 3 determines the travelable traffic lane in the road in front of the vehicle (Step S103). The travelable traffic lane determination unit 3 determines that the traffic lane L22 in the road L2 in front of the vehicle is the travelable traffic lane from the traffic lane L12 in the road L1 where the vehicle is currently located via the intersection N1. The travelable traffic lane determination unit 3 determines that the traffic lanes L21 and L23 on a right and left sides of the traffic lane L22 are also the travelable traffic lanes.

Then, the video signal generation unit 4 generates the video signal for displaying the driver support image to have the overlap with the travelable traffic lane in the view from the driver seat of the vehicle (Step S104). As illustrated in FIG. 5, the video signal generation unit 4 makes a driver support image IMG10 have an overlap with the traffic lanes L12 and L22 to link the traffic lane L12 where the vehicle is currently located and the travelable traffic lane L22. It is applicable as described in an embodiment 2 that the driver support image has the overlap with the traffic lanes L21 and L23 which are the travelable traffic lanes, however, in the present embodiment 1, the driver support image IMG10 has the overlap with only the traffic lane L22 located on an extension of the traffic lane L12. Then, the video signal output unit 5 outputs the video signal generated by the video signal generation unit 4 to the display device (Step S105).

As illustrated in FIG. 5, the driver support image IMG10 is an image having a width in a width direction of the traffic lanes L12 and L22 and extending in a direction in which the traffic lanes extend. The driver support image IMG10 is a transparent image, thus a driver can visually recognize an actual road through the driver support image IMG10.

A sequence of the processing from Step S101 to Step S105 in FIG. 4 described above is constantly repeated, and a latest driver support image IMG10 is constantly displayed on the display device. That is to say, the driver support image IMG10 displayed on the display device changes in accordance with a change of a position of the vehicle during traveling.

In the display control device 100 according to the present embodiment 1, the driver support image is displayed to have the overlap with the view from the driver seat in the vehicle, however, it is also applicable that the display control device 100 acquires the live-action video in front of the vehicle, and makes the display device display the driver support image to have the overlap with the live-action video in front of the vehicle. In this case, the display device is a liquid crystal display located in an instrument panel of the vehicle, for example.

In the display control device 100 according to the present embodiment 1, as described in an embodiment 5, the video signal generation unit 4 may generate the video signal for displaying the driver support image to have the overlap with a region other than the travelable traffic lane.

<Effect>

The display control device 100 according to the present embodiment 1 is a display control device which controls a display device displaying a driver support image to have an overlap with a view from a driver seat in a vehicle or a live-action video in front of the vehicle. The display control device 100 includes a vehicle position acquisition unit 1 acquiring a current position of the vehicle, a feature data acquisition unit 2 acquiring feature data regarding a road in front of the vehicle, a travelable traffic lane determination unit 3 determining a travelable traffic lane along which the vehicle can travel in the road in front of the vehicle based on the current position of the vehicle and the feature data, a video signal generation unit 4 generating a video signal for displaying the driver support image to have an overlap with the travelable traffic lane or a video signal for displaying the driver support image to have an overlap with a region other than the travelable traffic lane, and a video signal output unit 5 outputting the video signal to the display device. The driver support image having the overlap with the travelable traffic lane has a width in a width direction of the traffic lane and extends in a direction in which the traffic lane extends. The driver support image having the overlap with the region other than the travelable traffic lane is an image in which the travelable traffic lane can be distinguished according to a width and a length.

Thus, according to the display control device 100 and the display control method in the present embodiment 1, the driver support image is displayed to have the overlap with the travelable traffic lane in the view from the driver seat in the vehicle or the live-action video in front of the vehicle, thus the driver can effectively recognize the travelable traffic lane. Moreover, the driver support image is displayed to have the overlap with the region other than the travelable traffic lane in the view from the driver seat in the vehicle or the live-action video in front of the vehicle, thus the driver can effectively recognize the travelable traffic lane. The display of the driver support image suppresses a deviation of the vehicle from a correct route, thus energy wasted to return the vehicle to the correct route can be suppressed.

According to the display control device 100 and the display control method in the present embodiment 1, the driver support image having the overlap with the travelable traffic lane has the width in the width direction of the traffic lane and extends in the direction in which the traffic lane extends, thus visibility of the driver support image can be increased.

In the display control device 100 according to the present embodiment 1, when the road in front of the vehicle includes the intersection, the video signal generation unit 4 makes the driver support image have the overlap to link the traffic lane where the vehicle is currently located and the traffic lane in the road ahead of the intersection.

Thus, the driver can recognize the course in the intersection. Accordingly, the deviation of the vehicle from the correct route is suppressed, thus the energy wasted to return the vehicle to the correct route can be suppressed.

In the display control device 100 according to the present embodiment 1, the travelable traffic lane determination unit 3 determines the traffic lane along which the vehicle can travel in the road of which a navigation device of the vehicle performs a route guidance in the road in front of the vehicle. Even when the navigation device of the vehicle performs the route guidance, the driver support image can be displayed, thus the deviation of the vehicle from the correct route is suppressed in the route guidance, and the energy wasted to return the vehicle to the correct route can be suppressed.

Embodiment 2

A display control device 200 according to a present embodiment 2 has the same configuration as the display control device 100 according to the embodiment 1 (FIG. 1), thus a description thereof is omitted. In the display control device 200 according to the present embodiment 2, an operation of the video signal generation unit 4 is different from that in the embodiment 1.

In the display control device 200 according to the present embodiment 2, when there are a plurality of travelable traffic lanes in the road in front of the vehicle, the video signal generation unit 4 generates a video signal for displaying the driver support image to have an overlap with each of the plurality of travelable traffic lanes.

Figure 6:
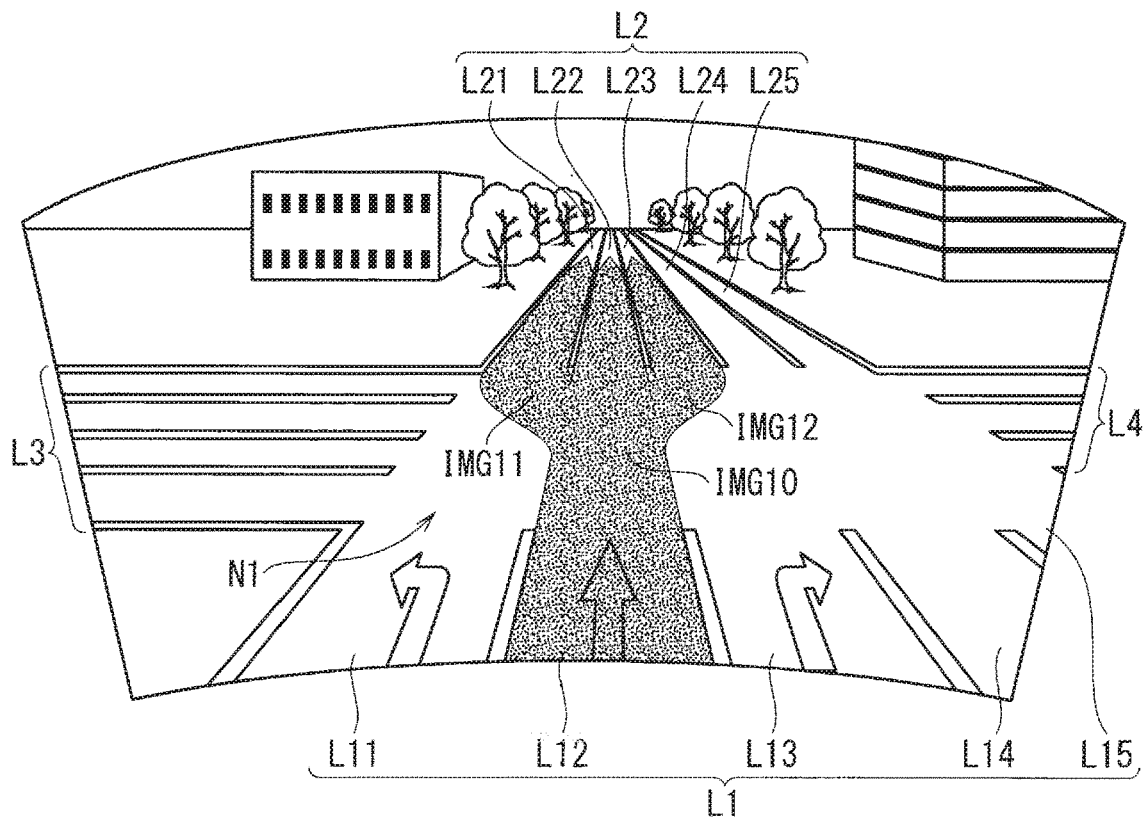
FIG. 6 A pattern diagram illustrating an example of a driver support image which a display control device according to an embodiment 2 makes a display device display and a view from a driver seat in a vehicle.

FIG. 6 is a pattern diagram illustrating an example of the driver support image which the display control device 200 makes the display device display and a view from a driver seat in a vehicle. The vehicle travels along the traffic lane L12 along which the vehicle can only go straight in the road L1 illustrated in FIG. 6. The plurality of traffic lanes L23, L24, and L25 in the road L2 in front of the vehicle are the travelable traffic lanes from the traffic lane L12 in the road L1 where the vehicle is currently located via the intersection N1.

In this case, the video signal generation unit 4 makes driver support images IMG11, IMG10, and IMG12 have an overlap with the traffic lanes L21, L22, and L23, respectively, to link the traffic lane L12 where the vehicle is currently located and each of the travelable traffic lanes L21, L22, and L23.

It is also applicable that the display control device 200 includes an operation input unit such as a touch panel, and the driver operates the operation input unit, thereby being able to switch between a setting of making the driver support image IMG10 have the overlap with only one traffic lane L22 as illustrated in FIG. 5 and a setting of making the driver support images IMG11, IMG10, and IMG12 have the overlap with the plurality of traffic lanes L21, L22, and L23, respectively, as illustrated in FIG. 6.

<Effect>

In the display control device 200 according to the present embodiment 2, when there are the plurality of travelable traffic lanes in one road in front of the vehicle, the video signal generation unit 4 generates the video signal for displaying the driver support image to have the overlap with each of the plurality of travelable traffic lanes.

According to the display control device 200 in the present embodiment 2, the driver support image is displayed to have the overlap with the plurality of travelable traffic lanes in one road. Thus, the driver can effectively recognize the travelable traffic lanes even when there are many traffic lanes in the road. Accordingly, the deviation of the vehicle from the correct route is suppressed, thus the energy wasted to return the vehicle to the correct route can be suppressed.

Embodiment 3

A display control device 300 according to a present embodiment 3 has the same configuration as the display control device 100 according to the embodiment 1 (FIG. 1), thus a description thereof is omitted. In the display control device 300 according to the present embodiment 3, an operation of the video signal generation unit 4 is different from that in the embodiment 1.

In the display control device 300 according to the present embodiment 3, when there are a plurality of travelable traffic lanes in one road in front of the vehicle, the video signal generation unit 4 generates a video signal for displaying the driver support image to have an overlap with each of the plurality of travelable traffic lanes in a display form based on a predetermined priority order.

In the present embodiment 3, the video signal generation unit 4 makes a driver support image with a larger width have an overlap with each of the plurality of travelable traffic lanes with increase in priority.

Figure 7:
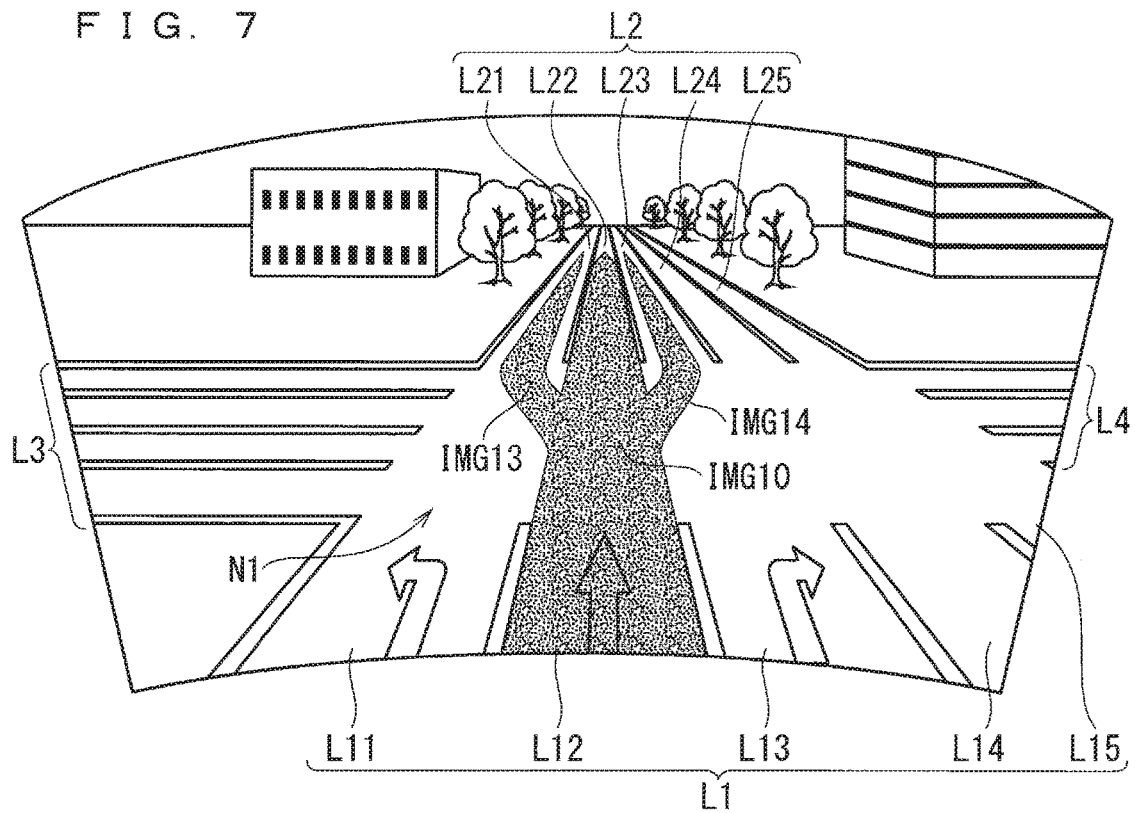
FIG. 7 A pattern diagram illustrating an example of a driver support image which a display control device according to an embodiment 3 makes a display device display and a view from a driver seat in a vehicle.

FIG. 7 is a pattern diagram illustrating an example of the driver support image which the display control device 300 makes the display device display and a view from a driver seat in a vehicle. The vehicle travels along the traffic lane L12 along which the vehicle can only go straight in the road L1 illustrated in FIG. 7. The traffic lanes L21, L22, and L23 in the road L2 in front of the vehicle are the travelable traffic lanes from the traffic lane L12 in the road L1 where the vehicle is currently located via the intersection N1.

The traffic lane L22 is located on an extension of the traffic lane L12 in the road L1 where the vehicle is currently located, thus the priority order of the traffic lane L22 is set highest. The priority order of each of the traffic lanes L21 and L23 on the right and left sides of the traffic lane L22 is set second highest after the traffic lane L22.

In the example in FIG. 7, the driver support image IMG10 with the large width has the overlap with the traffic lane L22 having the highest priority. The driver support images IMG13 and IMG14 with the smaller width than that of the driver support image IMG10 have the overlap with the traffic lanes L21 and L23 having the second highest priority after the traffic lane L22, respectively.

In the present embodiment 3, the video signal generation unit 4 may make a driver support image with a longer shape have an overlap with each of the plurality of travelable traffic lanes with increase in priority.

Figure 8:
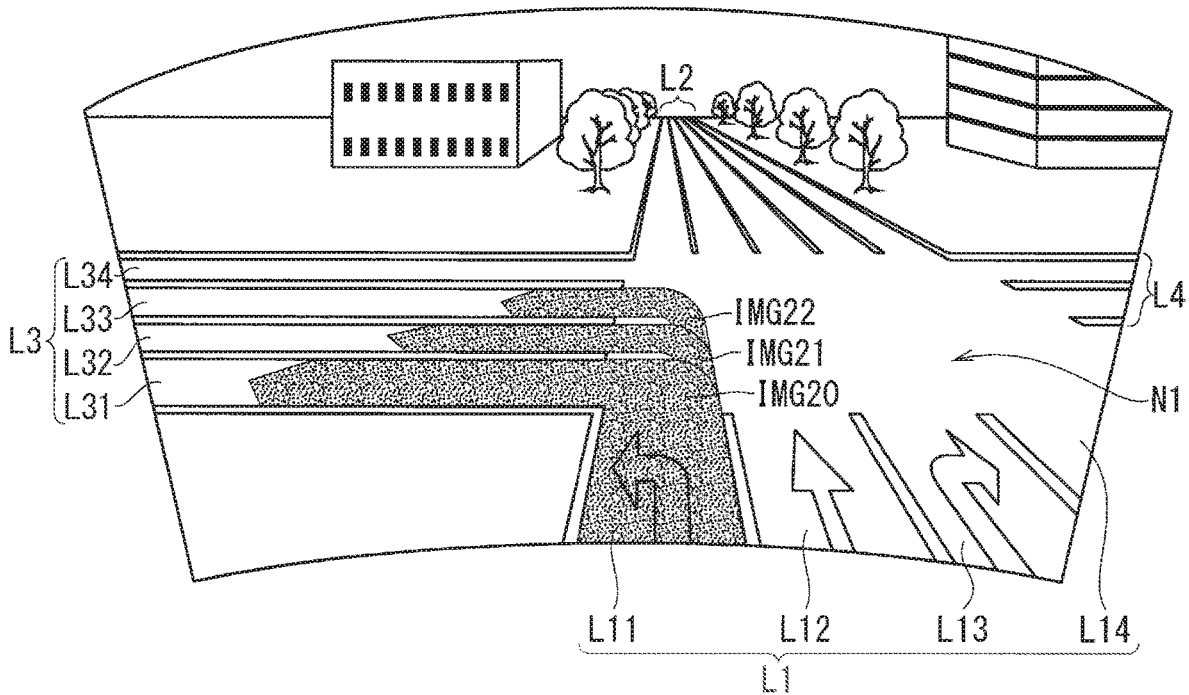
FIG. 8 A pattern diagram illustrating an example of a driver support image which the display control device according to the embodiment 3 makes the display device display and a view from a driver seat in a vehicle.

FIG. 8 is a pattern diagram illustrating an example of the driver support image which the display control device 300 makes the display device display and a view from a driver seat in a vehicle. The vehicle travels along the traffic lane L11 along which the vehicle can only turn left in the road L1 illustrated in FIG. 8. Traffic lanes L31, L32, and L33 in the road L3 in front of the vehicle are the travelable traffic lanes from the traffic lane L11 in the road L1 where the vehicle is currently located via the intersection N1. A traffic lane L34 in the road L3 is an opposite traffic lane.

The traffic lane L11 in the road L1 where the vehicle is currently located is a leftmost traffic lane in the road L1. Accordingly, the priority order of the traffic lane L31 located on the leftmost side in the road L2 with respect to the traveling direction is set highest. The priority order of the traffic lane L32 located next to the traffic lane L31 is set second highest after the traffic lane L31. The priority order of the traffic lane L33 located next to the traffic lane L32 is set second highest after the traffic lane L32.

In the example in FIG. 8, the driver support image IMG20 with a longest shape has the overlap with the traffic lane L31 having the highest priority. The driver support image IMG21 with a shorter shape than that of the driver support image IMG20 has the overlap with the traffic lane L32 having the second highest priority after the traffic lane L31. The driver support image IMG22 with a shorter shape than that of the driver support image IMG21 has the overlap with the traffic lane L33 having the second highest priority after the traffic lane L32.

In the present embodiment 3, the video signal generation unit 4 may make a driver support image with a deeper color have an overlap with each of the plurality of travelable traffic lanes with increase in priority.

Figure 9:
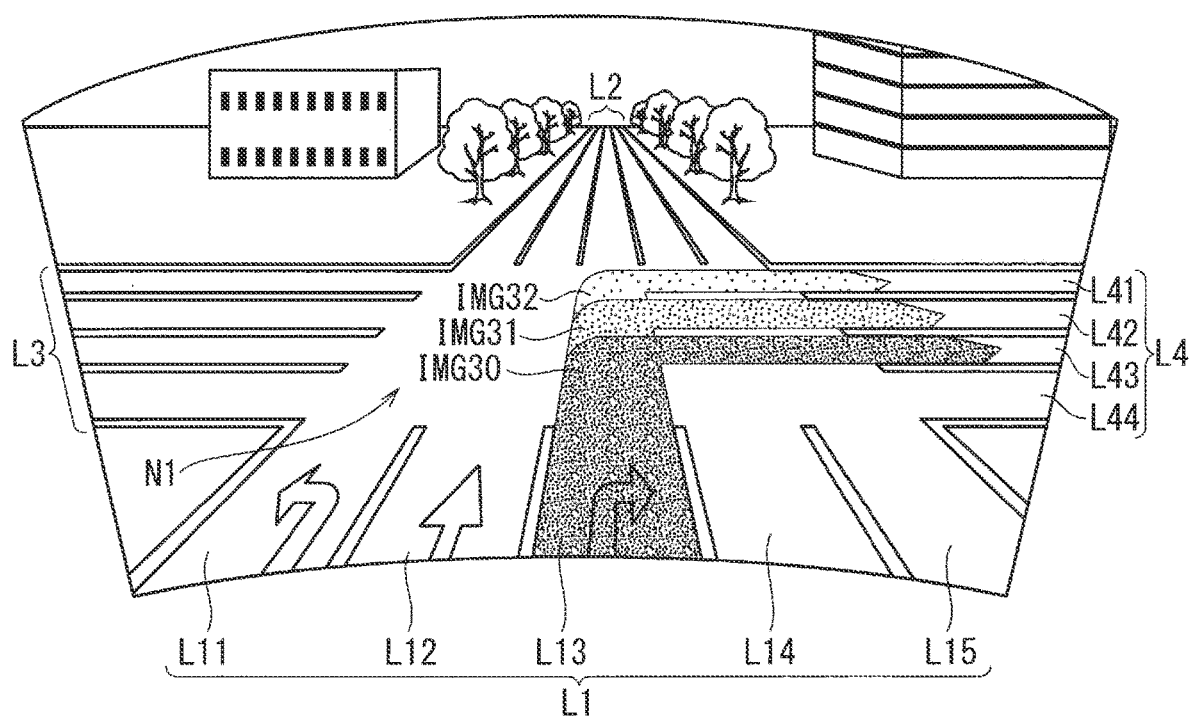
FIG. 9 A pattern diagram illustrating an example of a driver support image which the display control device according to the embodiment 3 makes the display device display and a view from a driver seat in a vehicle.

FIG. 9 is a pattern diagram illustrating an example of the driver support image which the display control device 300 makes the display device display and a view from a driver seat in a vehicle. The vehicle travels along the traffic lane L13 along which the vehicle can only turn right in the road L1 illustrated in FIG. 9. Traffic lanes L41, L42, and L43 in the road L4 in front of the vehicle are the travelable traffic lanes from the traffic lane L13 in the road L1 where the vehicle is currently located via the intersection N1. A traffic lane L44 in the road L4 is an opposite traffic lane.

The traffic lane L13 in the road L1 where the vehicle is currently located is a rightmost traffic lane except the opposite traffic lanes L14 and L15. Accordingly, the priority order of the traffic lane L43 located on the rightmost side in the travelable traffic lane in the road L3 with respect to the traveling direction of the vehicle is set highest. The priority order of the traffic lane L42 located next to the traffic lane L43 is set second highest after the traffic lane L43. The priority order of the traffic lane L41 located next to the traffic lane L42 is set second highest after the traffic lane L42.

In the example in FIG. 9, the driver support image IMG30 with a deepest color has the overlap with the traffic lane L43 having the highest priority. The driver support image IMG31 with a lighter color than that of the driver support image IMG30 has the overlap with the traffic lane L42 having the second highest priority after the traffic lane L43. The driver support image IMG32 with a lighter color than that of the driver support image IMG31 has the overlap with the traffic lane L41 having the second highest priority after the traffic lane L42.

In the present embodiment 3, the video signal generation unit 4 may make a driver support image have an overlap with a traffic lane having the highest priority in the plurality of travelable traffic lanes, and may make an image of an arrow have an overlap with and indicate the other travelable traffic lane.

Figure 10:
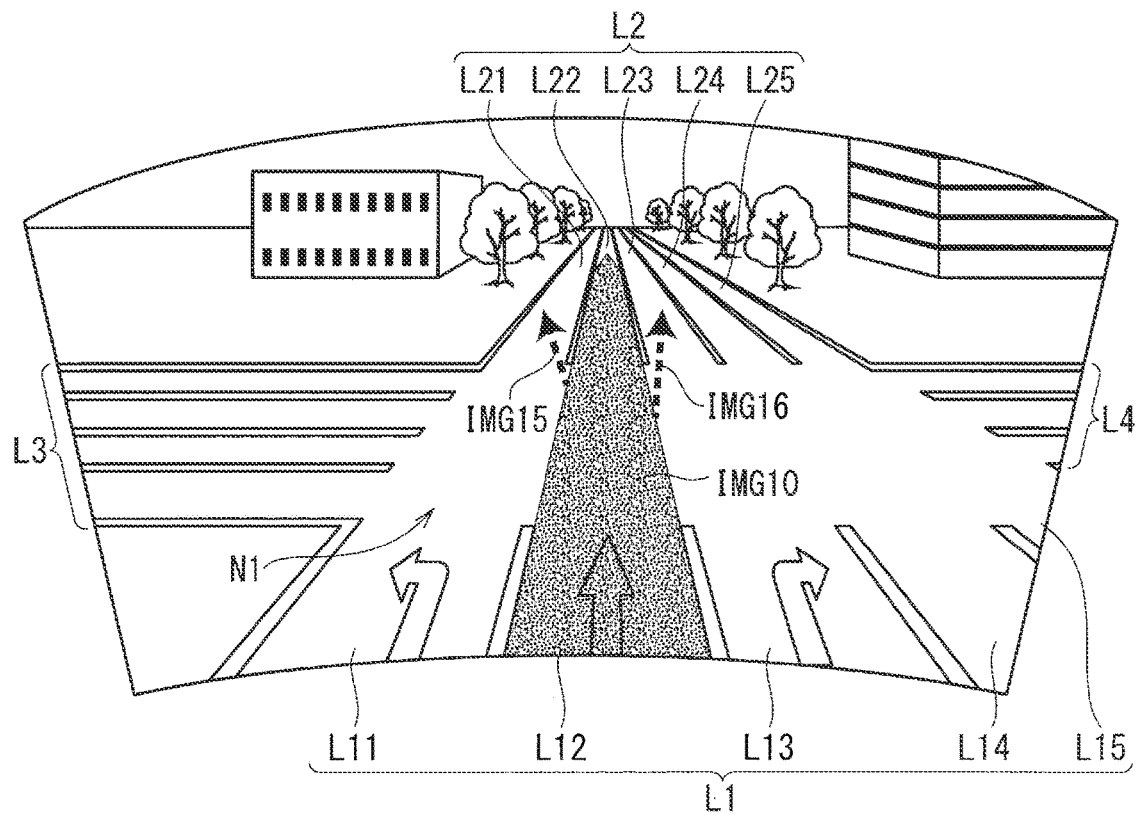
FIG. 10 A pattern diagram illustrating an example of a driver support image which the display control device according to the embodiment 3 makes the display device display and a view from a driver seat in a vehicle.

FIG. 10 is a pattern diagram illustrating an example of the driver support image which the display control device 300 makes the display device display and a view from a driver seat in a vehicle. The vehicle travels along the traffic lane L12 along which the vehicle can only go straight in the road L1 illustrated in FIG. 10. The traffic lanes L21, L22, and L23 in the road L2 in front of the vehicle are the travelable traffic lanes from the traffic lane L12 in the road L1 where the vehicle is currently located via the intersection N1, and the priority order of the traffic lane L22 is set highest.

In the example in FIG. 10, the driver support image IMG10 has the overlap with the traffic lane L22 having the highest priority. Arrow images IMG15 and IMG16 have an overlap with and indicate the travelable traffic lanes L21 and L23, respectively, other than the traffic lane L22 having the highest priority <Effect>

In the display control device 300 according to the present embodiment 3, the video signal generation unit 4 generates the video signal for displaying the driver support image to have the overlap with each of the plurality of travelable traffic lanes in the display form based on the predetermined priority order.

Thus, according to the display control device 300 in the present embodiment 3, the plurality of travelable traffic lanes are displayed in the display form based on the predetermined priority order. Accordingly, the driver can effectively recognize which traffic lane has the highest priority in the plurality of travelable traffic lanes.

In the display control device 300 according to the present embodiment 3, the driver support image displayed to have the overlap with the plurality of travelable traffic lanes is displayed with the deeper color with increase in a predetermined priority of the travelable traffic lane.

Accordingly, the driver support image is displayed with the deeper color with increase in priority on the plurality of travelable traffic lanes, thus the driver can recognize more effectively which traffic lane has the high priority.

In the display control device 300 according to the present embodiment 3, the driver support image displayed to have the overlap with the plurality of travelable traffic lanes is displayed with the longer shape with increase in the predetermined priority of the travelable traffic lane.

Accordingly, the driver support image is displayed with the longer shape with increase in priority on the plurality of travelable traffic lanes, thus the driver can recognize more effectively which traffic lane has the high priority.

In the display control device 300 according to the present embodiment 3, the driver support image displayed to have the overlap with the plurality of travelable traffic lanes is displayed with the larger width with increase in the predetermined priority of the travelable traffic lane.

Accordingly, the driver support image is displayed with the larger width with increase in priority on the plurality of travelable traffic lanes, thus the driver can recognize more effectively which traffic lane has the high priority.

In the display control device 300 according to the present embodiment 3, the driver support image is displayed to have the overlap with the traffic lane having the highest predetermined priority in the plurality of travelable traffic lanes, and the image of the arrow has an overlap with and indicates the other travelable traffic lane. Accordingly, the driver can recognize more effectively the traffic lane having the highest priority. The driver can also recognize the traffic lane which does not have so high priority by the display of the image of the arrow.

Embodiment 4

A display control device 400 according to a present embodiment 4 has the same configuration as the display control device 100 according to the embodiment 1 (FIG. 1), thus a description thereof is omitted. In the display control device 400 according to the present embodiment 4, an operation of the video signal generation unit 4 is different from that in the embodiment 1.

In the display control device 400 according to the present embodiment 4, when the road in front of the vehicle branches off into a plurality of roads and each of the plurality of branched roads includes the travelable traffic lane, the video signal generation unit 4 generates a video signal for displaying the driver support image to have an overlap with each of the travelable traffic lanes in the plurality of branched roads.

Figure 11:
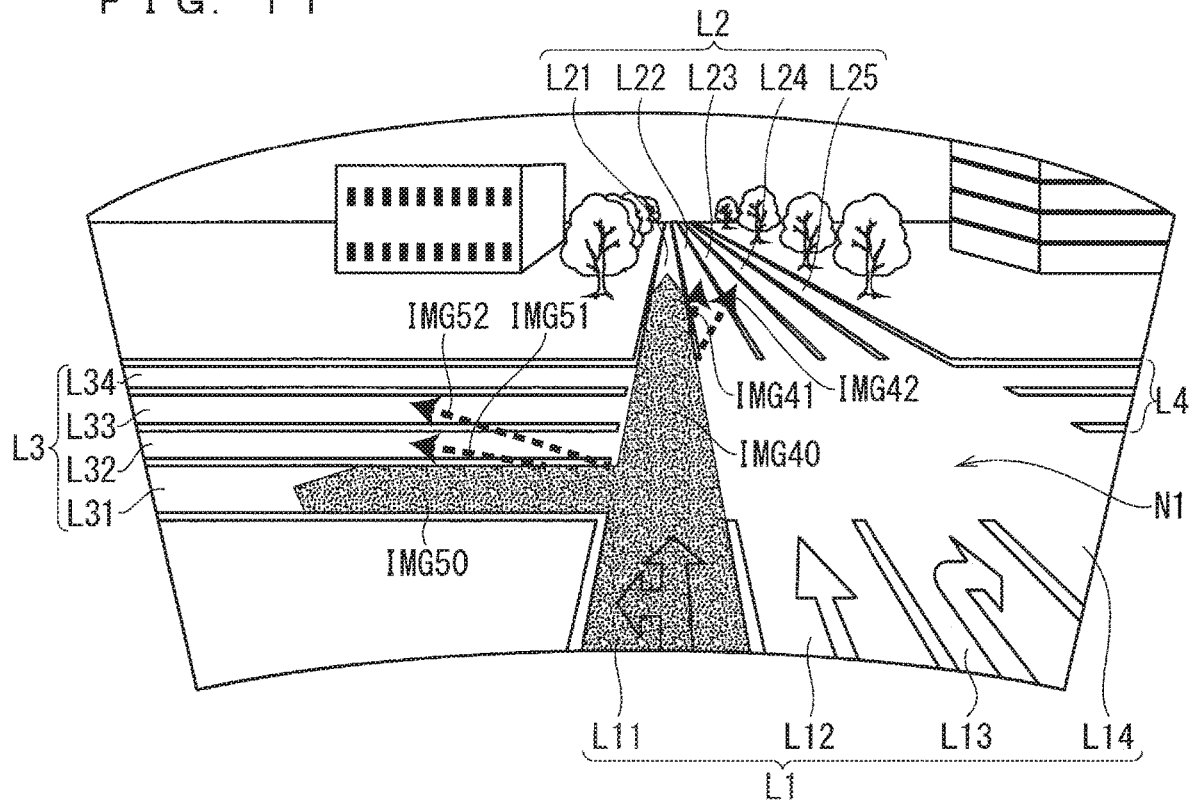
FIG. 11 A pattern diagram illustrating an example of a driver support image which a display control device according to an embodiment 4 makes the display device display and a view from a driver seat in a vehicle.

FIG. 11 is a pattern diagram illustrating an example of the driver support image which the display control device 400 makes the display device display and a view from a driver seat in a vehicle. The vehicle travels along the traffic lane L11 along which the vehicle can go straight or turn left in the road L1 illustrated in FIG. 11. The travelable traffic lane determination unit 3 determines that the traffic lanes L21, L22, and L23 in the road L2 in front of the vehicle are the travelable traffic lanes from the traffic lane L11 of the road L1 where the vehicle is currently located via the intersection N1. The travelable traffic lane determination unit 2 determines that the traffic lanes L31, L32, and L33 in the road L3 in front of the vehicle are the travelable traffic lanes from the traffic lane L11 of the road L1 where the vehicle is currently located via the intersection N1.

As illustrated in FIG. 11, the video signal generation unit 4 makes a driver support image IMG40 have an overlap with the traffic lanes L11 and L21 to link the traffic lane L11 where the vehicle is currently located and the travelable traffic lane L21 in the road L2. Herein, the traffic lane L21 with which the driver support image IMG40 has the overlap is a traffic lane having the highest priority in the traffic lanes L21, L22, and L23. The video signal generation unit 4 further makes a driver support image IMG50 have an overlap with the travelable traffic lane L31 in the road L3. The traffic lane L31 with which the driver support image IMG50 has the overlap is a traffic lane having the highest priority in the traffic lanes L31, L32, and L33.

The driver support image may be displayed with different colors in accordance with a difference of the traveling direction by displaying the driver support image IMG40 indicating the vehicle going straight with a blue color and displaying the driver support image IMG50 indicating the vehicle turning left with a brown color, for example.

As illustrated in FIG. 11, the video signal generation unit 4 may make arrow images IMG41 and IMG42 have an overlap with and indicate each of the travelable traffic lanes L22 and L23, respectively, other than the traffic lane L21 having the highest priority in the road L2.

In the similar manner, as illustrated in FIG. 11, the video signal generation unit 4 may make arrow images IMG51 and IMG52 have an overlap with and indicate each of the travelable traffic lanes L32 and L33, respectively, other than the traffic lane L31 having the highest priority in the road L3.

Figure 12:
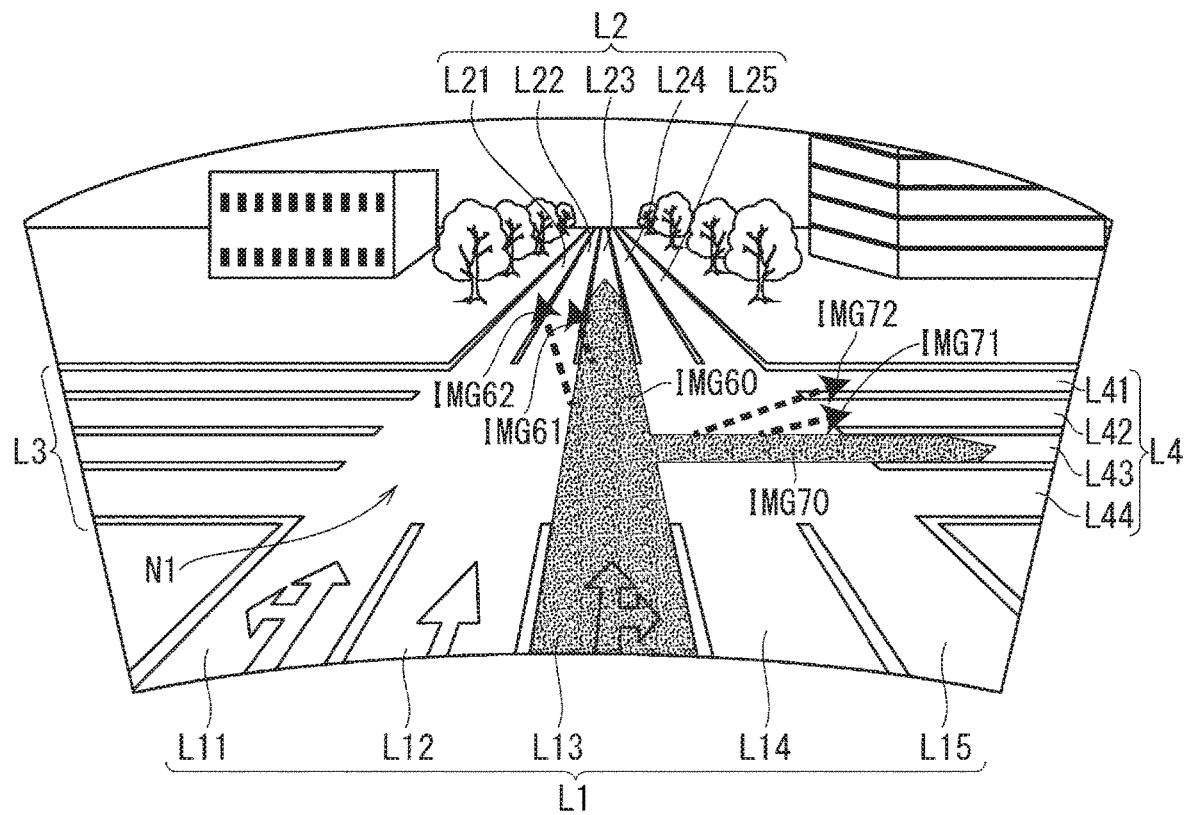
FIG. 12 A pattern diagram illustrating an example of a driver support image which the display control device according to the embodiment 4 makes the display device display and a view from a driver seat in a vehicle.

FIG. 12 is a pattern diagram illustrating an example of the driver support image which the display control device 400 makes the display device display and a view from a driver seat in a vehicle. The vehicle travels along the traffic lane L13 along which the vehicle can go straight or turn right in the road L1 illustrated in FIG. 12. The travelable traffic lane determination unit 3 determines that the traffic lanes L21, L22, and L23 in the road L2 in front of the vehicle are the travelable traffic lanes from the traffic lane L13 of the road L1 where the vehicle is currently located via the intersection N1. The travelable traffic lane determination unit 3 determines that the traffic lanes L41, L42, and L43 in the road L4 in front of the vehicle are the travelable traffic lanes from the traffic lane L13 of the road L1 where the vehicle is currently located via the intersection N1.

As illustrated in FIG. 12, the video signal generation unit 4 makes a driver support image IMG60 have an overlap with the traffic lanes L13 and L23 to link the traffic lane L13 where the vehicle is currently located and the travelable traffic lane L23 in the road L2. Herein, the traffic lane L23 with which the driver support image IMG60 has the overlap is a traffic lane having the highest priority in the traffic lanes L21, L22, and L23. The video signal generation unit 4 further makes a driver support image IMG70 have an overlap with the travelable traffic lane L43 in the road L4. The traffic lane L43 with which the driver support image IMG70 has the overlap is a traffic lane having the highest priority in the traffic lanes L41, L42, and L43.

The driver support image may be displayed with different colors in accordance with a difference of the traveling direction by displaying the driver support image IMG60 indicating the vehicle going straight with a blue color and displaying the driver support image IMG70 indicating the vehicle turning right with a green color, for example.

As illustrated in FIG. 12, the video signal generation unit 4 may make arrow images IMG61 and IMG62 have an overlap with and indicate each of the travelable traffic lanes L22 and L23, respectively, other than the traffic lane L23 having the highest priority in the road L2.

In the similar manner, as illustrated in FIG. 12, the video signal generation unit 4 may make arrow images IMG71 and IMG72 have an overlap with and indicate each of the travelable traffic lanes L41 and L42, respectively, other than the traffic lane L43 having the highest priority in the road L4.

<Effect>

In the display control device 400 according to the present embodiment 4, when the road in front of the vehicle branches off into a plurality of roads and each of the plurality of branched roads includes the travelable traffic lane, the video signal generation unit 4 generates a video signal for displaying the driver support image to have an overlap with each of the travelable traffic lanes in the plurality of branched roads.

When each of the branched roads includes the travelable traffic lane, the driver support image is displayed to have the overlap with the traffic lane in each of the branched roads, thus the driver can recognize effectively which traffic lane in which road the driver can travel along in an intersection having a complex branch. Accordingly, the deviation of the vehicle from the correct route is suppressed, thus the energy wasted to return the vehicle to the correct route can be suppressed.

Embodiment 5

A display control device 500 according to a present embodiment 5 has the same configuration as the display control device 100 according to the embodiment 1 (FIG. 1), thus a description thereof is omitted. In the display control device 500 according to the present embodiment 5, an operation of the video signal generation unit 4 is different from that in the embodiment 1.

Figure 13:
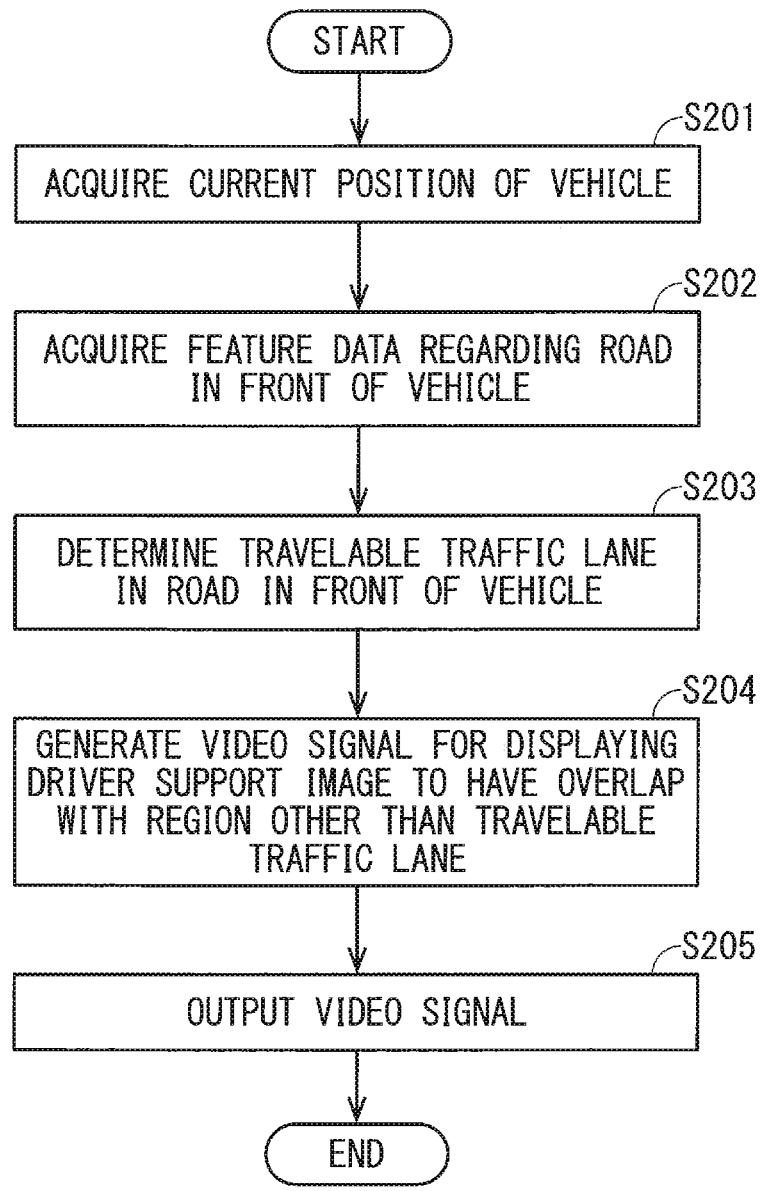
FIG. 13 A flow chart illustrating an operation of a display control device according to an embodiment 5.

FIG. 13 is a flow chart illustrating an operation of the display control device 500. Steps S201, S202, S203, and S205 in FIG. 13 are similar to Steps S101, S102, S103, and S105 in FIG. 4, thus a description thereof is omitted.

As illustrated in Step S204 in FIG. 13, in the present embodiment 5, the video signal generation unit 4 generates a video signal for displaying a driver support image to have an overlap with a region other than the travelable traffic lane. The driver support image having the overlap with the region other than the travelable traffic lane is an image in which the travelable traffic lane can be distinguished according to a width and a length. More specifically, the driver support image having the overlap with the region other than the travelable traffic lane is an image in which the region other than the travelable traffic lane is darkened.

Figure 14:
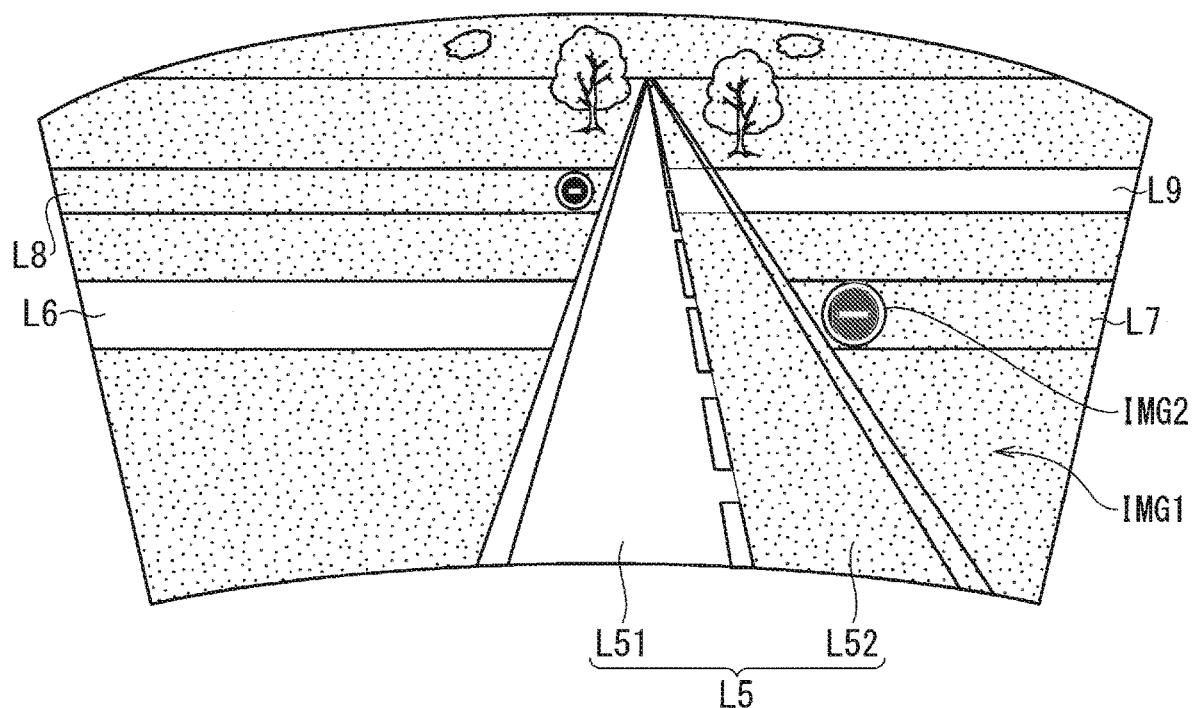
FIG. 14 A pattern diagram illustrating an example of a driver support image which the display control device according to the embodiment 5 makes the display device display and a view from a driver seat in a vehicle.

FIG. 14 is a pattern diagram illustrating an example of the driver support image which the display control device 500 makes the display device display and a view from a driver seat in a vehicle.

As illustrated in FIG. 14, roads L6, L7, L8, and L9 are connected to a road L5 including traffic lanes L51 and L52. Each of the roads L6, L7, L8, and L9 is a road having a one-way traffic lane. The vehicle currently travels along the traffic lane L51 in the road L5. The traffic lane L52 in the road L5 is an opposite traffic lane.

The travelable traffic lane determination unit 3 determines that the traffic lane L51 in the road L5 where the vehicle is currently located, the traffic lane in the road L6, and the traffic lane in the road L9 are the travelable traffic lanes.

As illustrated in FIG. 14, the video signal generation unit 4 makes a driver support image IMG1 have an overlap with a region other than the traffic lane L51 in the road L5 where the vehicle is currently located, the traffic lane in the road L6, and the traffic lane in the road L9. The driver support image IMG1 is a transparent image, and the region other than the travelable traffic lane with which the driver support image IMG1 has the overlap is displayed to be darkly seen.

As illustrated in FIG. 14, the video signal generation unit 4 may make a mark IMG2 indicating no-entry have an overlap with the roads L7 and L8 which the vehicle is restricted from entering from the travelable traffic lane L51. The mark IMG2 indicating no-entry is a mark representing a vehicle-free sign, a vehicle closure sign, and a road closed sign, for example.

It is also applicable that the display control device 500 includes an operation input unit such as a touch panel, and the driver operates the operation input unit, thereby being able to switch between a setting of making the driver support image have the overlap with the travelable traffic lane as illustrated in FIG. 5 and a setting of making the driver support image have the overlap with the region other than the travelable traffic lane as illustrated in FIG. 14.

<Effect>

In the display control device 500 according to the present embodiment 5, the driver support image having the overlap with the region other than the travelable traffic lane is an image in which the region other than the travelable traffic lane is darkened.

Since the region other than the travelable traffic lane is darkened, the travelable traffic lane is relatively brightly displayed, thus the driver can effectively recognize the travelable traffic lane. Accordingly, the deviation of the vehicle from the correct route is suppressed, thus the energy wasted to return the vehicle to the correct route can be suppressed.

In the display control device 500 according to the present embodiment 5, the video signal generation unit 4 can switch whether to make the driver support image have the overlap with the travelable traffic lane or make the driver support image have the overlap with the region other than the travelable traffic lane. Accordingly, the display form desired by the driver can be selected, thus the convenience is increased.

In the display control device 500 according to the present embodiment 5, the video signal generation unit 4 generates a video signal for displaying a mark indicating no-entry to have an overlap with the road which the vehicle is restricted from entering from the travelable traffic lane in addition to the overlap of the driver support image.

Accordingly, the mark indicating no-entry has the overlap with the road which the vehicle is restricted from entering, thus the driver can more reliably recognize the road which the vehicle is restricted from entering.

Embodiment 6

A display control device 600 according to a present embodiment 6 has the same configuration as the display control device 100 according to the embodiment 1 (FIG. 1), thus a description thereof is omitted. In the display control device 600 according to the present embodiment 6, an operation of the video signal generation unit 4 is different from that in the embodiment 1.

In the display control device 600 according to the present embodiment 6, when the feature data acquisition unit 2 acquires data indicating that there is no lane edge line in the travelable traffic lane, the video signal generation unit 4 generates a video signal for displaying a driver support image to have an overlap with the travelable traffic lane.

Figure 15:
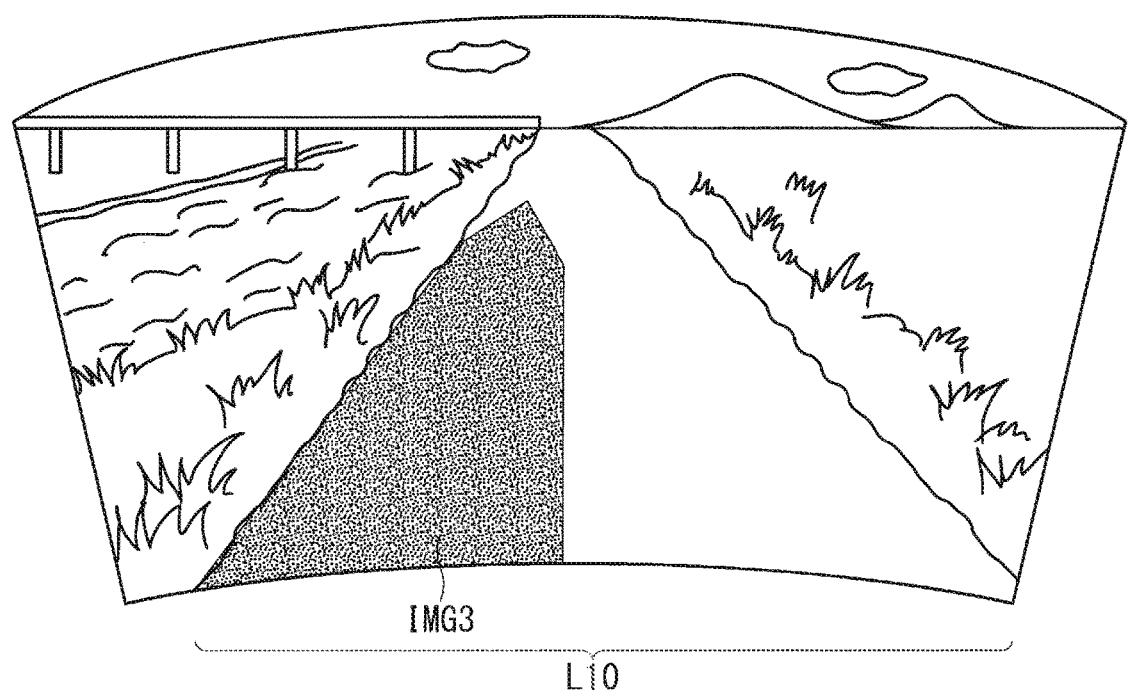
FIG. 15 A pattern diagram illustrating an example of a driver support image which a display control device according to an embodiment 6 makes the display device display and a view from a driver seat in a vehicle.

FIG. 15 is a pattern diagram illustrating an example of the driver support image which the display control device 600 makes the display device display and a view from a driver seat in a vehicle. As illustrated in FIG. 15, the vehicle currently travels along the travelable traffic lane in a road L10 along a river. The road L10 does not have the lane edge line. The lane edge line is a line such as a white line painted on a road surface along an outer side of a pavement.

The feature data acquisition unit 2 may acquire the data indicating that there is no lane edge line in the road L10 from a database on an outer side or an inner side of the display control device 600, or may acquire the data based on an output of a sensor mounted on the vehicle for monitoring the road surface. When the feature data acquisition unit 2 acquires the data indicating that there is no lane edge line, the video signal generation unit 4 makes a driver support image IMG3 have an overlap with the travelable traffic lane in the road L10.

<Effect>

In the display control device 600 according to the present embodiment 6, when the feature data acquisition unit 2 acquires data indicating that there is no lane edge line in the travelable traffic lane, the video signal generation unit 4 generates a video signal for displaying a driver support image to have an overlap with the travelable traffic lane.

The driver support image is displayed to have the overlap with the road, which does not have the lane edge line and thus makes the driver hardly recognize whether the driver can travel along the road, accordingly, suppressed is the vehicle going around the road with no lane edge line to make a detour to the other road, and the energy consumption of the vehicle can be suppressed.

Embodiment 7

A display control device 700 according to a present embodiment 7 has the same configuration as the display control device 100 according to the embodiment 1 (FIG. 1), thus a description thereof is omitted. In the display control device 700 according to the present embodiment 7, an operation of the video signal generation unit 4 is different from that in the embodiment 1.

In the display control device 700 according to the present embodiment 7, when the feature data acquisition unit 2 acquires data indicating that a road surface of the travelable traffic lane is formed of a stone pavement, the video signal generation unit 4 generates a video signal for displaying a driver support image to have an overlap with the travelable traffic lane.

Figure 16:
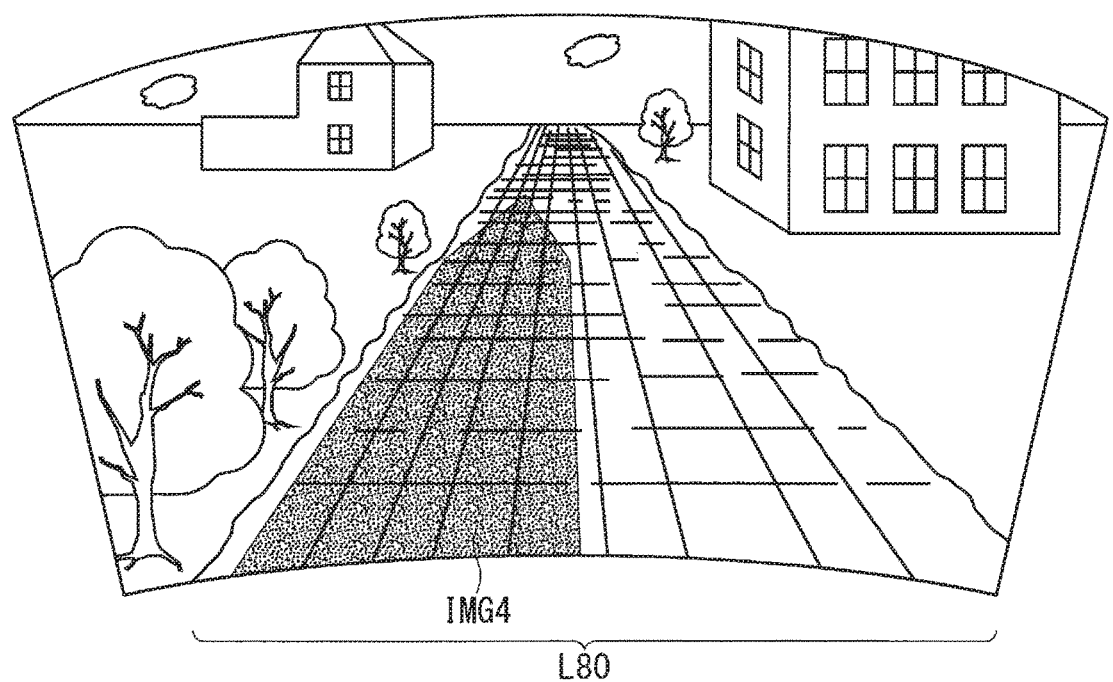
FIG. 16 A pattern diagram illustrating an example of a driver support image which a display control device according to an embodiment 7 makes the display device display and a view from a driver seat in a vehicle.

FIG. 16 is a pattern diagram illustrating an example of the driver support image which the display control device 700 makes the display device display and a view from a driver seat in a vehicle. As illustrated in FIG. 16, the vehicle currently travels along the travelable traffic lane in a road L80 of the stone pavement. A road surface of the road L80 is formed of a stone pavement. The road of the stone pavement in the specification of the present application is not limited to a road paved with stones, but may be a road paved with tiles and bricks, for example.

The feature data acquisition unit 2 may acquire the data indicating that the road surface of the road L80 is formed of the stone pavement from a database on an outer side or an inner side of the display control device 700, or may acquire the data based on an output of a sensor mounted on the vehicle for monitoring the road surface. When the feature data acquisition unit 2 acquires the data indicating that the road surface of the travelable traffic lane (that is to say, the road surface of the road L80 in FIG. 16) is formed of the stone pavement, the video signal generation unit 4 makes a driver support image IMG4 have an overlap with the travelable traffic lane in the road L11.

<Effect>

In the display control device 700 according to the present embodiment 7, when the feature data acquisition unit 2 acquires data indicating that a road surface of the travelable traffic lane is formed of a stone pavement, the video signal generation unit 4 generates a video signal for displaying a driver support image to have an overlap with the travelable traffic lane.

Accordingly, the driver support image is displayed to have the overlap with the road such as the stone pavement which makes the driver hardly recognize whether the driver can travel along the road, thus suppressed is the vehicle going around the road of the stone pavement to make a detour to the other road, and the energy consumed by the vehicle travel can be suppressed.

Embodiment 8

A display control device 800 according to a present embodiment 8 has the same configuration as the display control device 100 according to the embodiment 1 (FIG. 1), thus a description thereof is omitted. In the display control device 800 according to the present embodiment 8, an operation of the video signal generation unit 4 is different from that in the embodiment 1.

In the display control device 800 according to the present embodiment 8, when the feature data acquisition unit 2 acquires data indicating that a road in front of the vehicle has an overlap with a track of a light rail line or a trolleybus, the video signal generation unit 4 generates a video signal for displaying a driver support image to have an overlap with the travelable traffic lane in the road in front of the vehicle.

Figure 17:
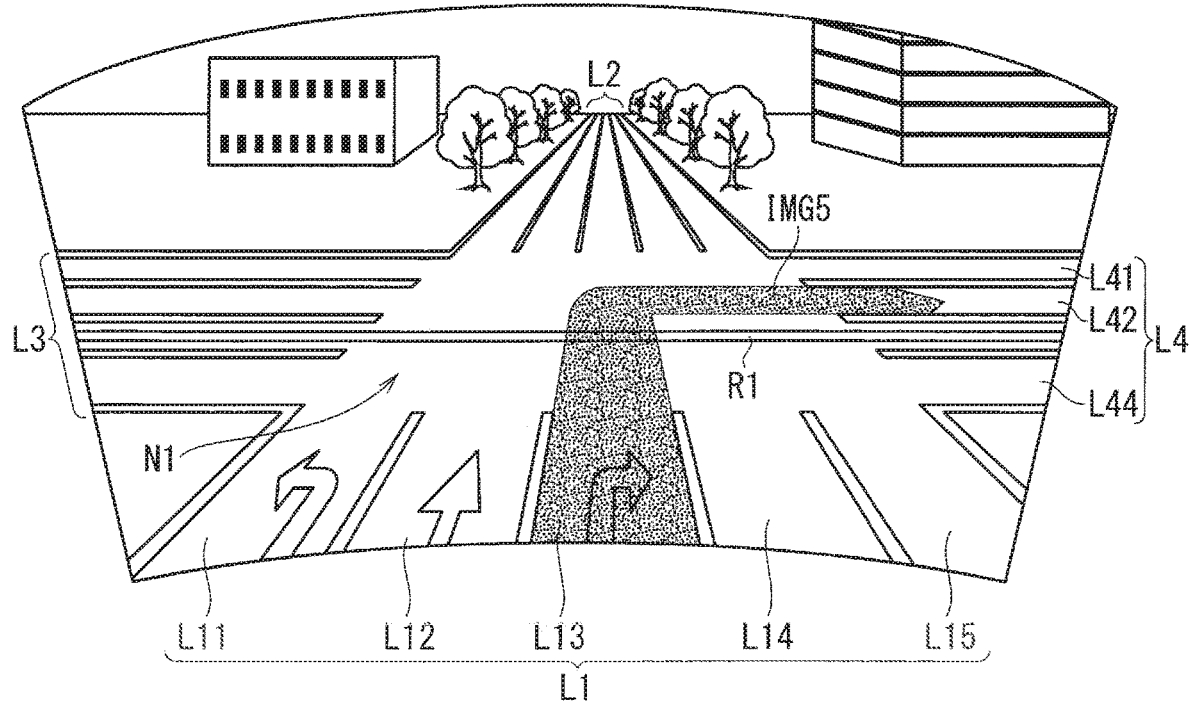
FIG. 17 A pattern diagram illustrating an example of a driver support image which a display control device according to an embodiment 8 makes the display device display and a view from a driver seat in a vehicle.

FIG. 17 is a pattern diagram illustrating an example of the driver support image which the display control device 800 makes the display device display and a view from a driver seat in a vehicle. As illustrated in FIG. 17, a track R1 of a light rail line or a trolleybus is disposed to go across the intersection N1 in a direction of the roads L3 and L4. The vehicle currently travels along the traffic lane L13 along which the vehicle can only turn right in the road L1.

When the vehicle travels along the road L1 to get close to the intersection N1, the feature data acquisition unit 2 acquires data indicating the road in front of the vehicle has the overlap with the track R1 of the light rail line or the trolleybus. The feature data acquisition unit 2 may acquire the data indicating that that the road in front of the vehicle has the overlap with the track R1 of the light rail line or the trolleybus from a database on an outer side or an inner side of the display control device 700, or may acquire the data based on an output of a sensor mounted on the vehicle for monitoring the road surface.

When the feature data acquisition unit 2 acquires the data indicating that that the road in front of the vehicle has the overlap with the track R1 of the light rail line or the trolleybus, the video signal generation unit 4 makes a driver support image IMG5 have an overlap with the travelable traffic lane L42 to link the traffic lane L13 where the vehicle is currently located and the travelable traffic lane L42.

In the display control device 800 according to the present embodiment 8, at least one setting of a density, color, and pattern of the driver support image may be changeable in accordance with an operation of a user (that is to say, a driver). For example, when the track R1 has a complex overlap with the road, the density of the driver support image IMG5 is increased, the color of the driver support image IMG5 is changed to a color distinguishable from the road, or the pattern of the driver support image IMG5 is changed to a meshed pattern, thus the visibility of the driver support image IMG5 can be increased.

<Effect>

In the display control device 800 according to the present embodiment 8, when the feature data acquisition unit 2 acquires data indicating that the road in front of the vehicle has the overlap with the track of the light rail line or the trolleybus, the video signal generation unit 4 generates the video signal for displaying the driver support image to have the overlap with the travelable traffic lane in the road in front of the vehicle.

Accordingly, the driver support image is displayed to have the overlap with the road which makes the driver hardly recognize whether the driver can travel along the road by reason that the roads has the overlap with the track of the light rail line or the trolleybus, thus suppressed is the vehicle traveling along a wrong traffic lane, and the energy consumed by the vehicle travel can be suppressed.

In the display control device 800 according to the present embodiment 8, at least one setting of the density, color, and pattern of the driver support image can be changed in accordance with the operation of the user. Accordingly, even when the track of the light rail line, for example, has the overlap with the road surface of the road, the visibility of the driver support image can be increased.

Embodiment 9

Figure 18:
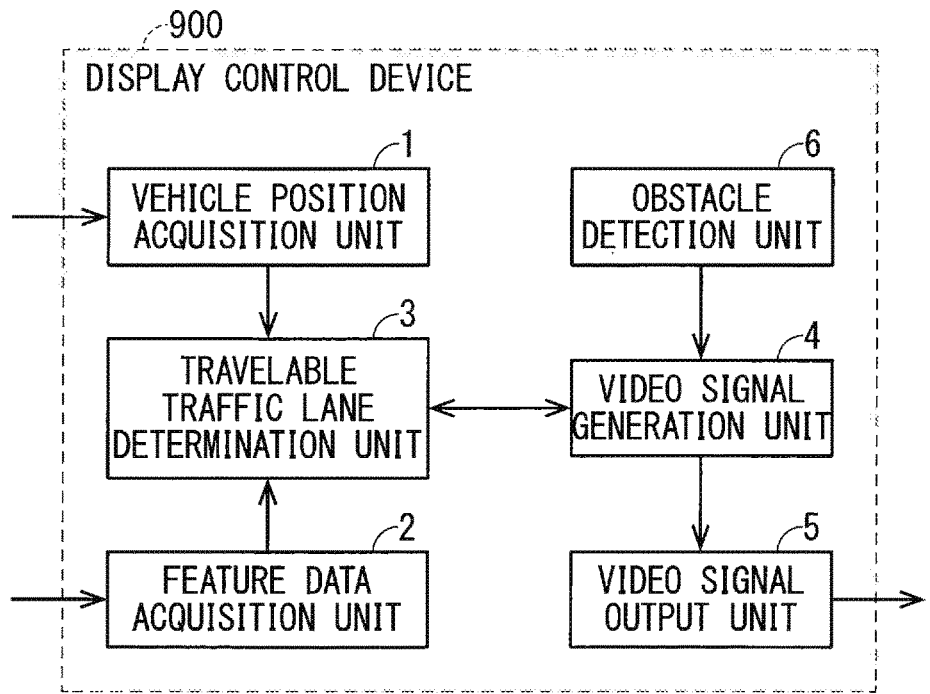
FIG. 18 A block diagram of a display control device according to an embodiment 9.

FIG. 18 is a block diagram of a display control device 900 in a present embodiment 9. The display control device 900 further includes an obstacle detection unit 6. The other configuration in the display control device 900 is the same as that of the display control device 100 (FIG. 1), thus a description thereof is omitted.

Figure 3:
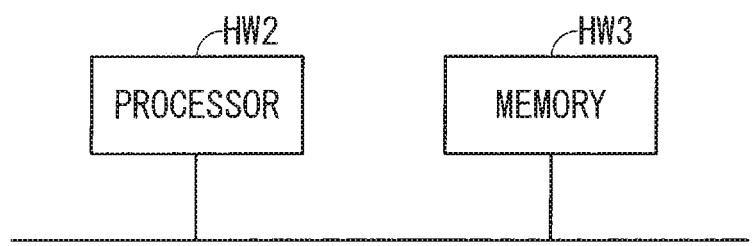
FIG. 3 A hardware configuration diagram of the display control device according to the embodiment 1.

The obstacle detection unit 6 detects an obstacle on the road in front of the vehicle. The obstacle detection unit 6 is achieved by a combination of, for example, an ultrasonic sensor (also referred to as "sonar"), a camera, a milliwave radar, and a laser radar mounted on the vehicle with the processing circuit HW1 illustrated in FIG. 2 and the processor HW2 and the memory HW3 illustrated in FIG. 3.

Figure 19:
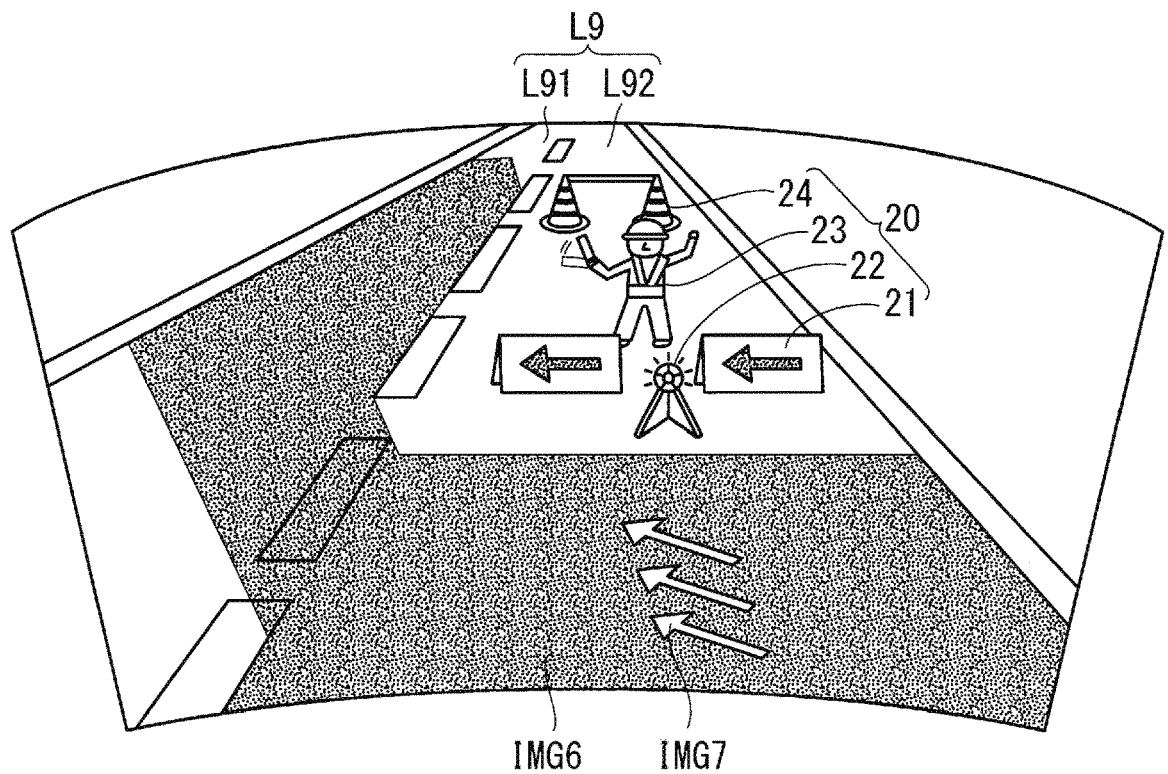
FIG. 19 A pattern diagram illustrating an example of a driver support image which the display control device according to the embodiment 9 makes the display device display and a view from a driver seat in a vehicle.

FIG. 19 is a pattern diagram illustrating an example of the driver support image which the display control device 900 makes the display device display and a view from a driver seat in a vehicle. As illustrated in FIG. 19, in the road L9 including traffic lanes L91 and L92, the vehicle currently travels along the traffic lane L92. In the traffic lane L92, there is an obstacle 20 due to a road repairing, for example. The obstacle 20 includes, for example, a signboard 21, a construction lamp 22, a guide 23, and a cone 24.

When the obstacle detection unit 6 of the vehicle traveling along the traffic lane L92 detects the obstacle 20 in front of the vehicle, the video signal generation unit 4 makes a driver support image IMG6 have an overlap with the travelable traffic lane L91 to link the traffic lane L92 along which the vehicle currently travels and the travelable traffic lane L91 which does not include the obstacle 20.

As illustrated in FIG. 19, the video signal generation unit 4 may make an arrow image IMG7 indicating a direction of a traffic lane change have an overlap in addition to the overlap of the driver support image IMG6 to promote the change of the traffic lane to the driver more effectively.

<Effect>

The display control device 900 according to the present embodiment 9 further includes the obstacle detection unit 6 detecting the obstacle on the road in front of the vehicle. When there is the obstacle on the traffic lane along which the vehicle travels, the video signal generation unit 4 generates the video signal for displaying the driver support image to have the overlap with the travelable traffic lane to link the traffic lane along which the vehicle currently travels and the travelable traffic lane which does not include the obstacle.

In the display control device 900 according to the present embodiment 9, the obstacle is detected and the driver support image for guiding a course of the vehicle to avoid the obstacle is displayed, thus the vehicle can smoothly avoid the obstacle. Accordingly, the energy consumed by the vehicle travel can be suppressed.

Embodiment 10

Figure 20:
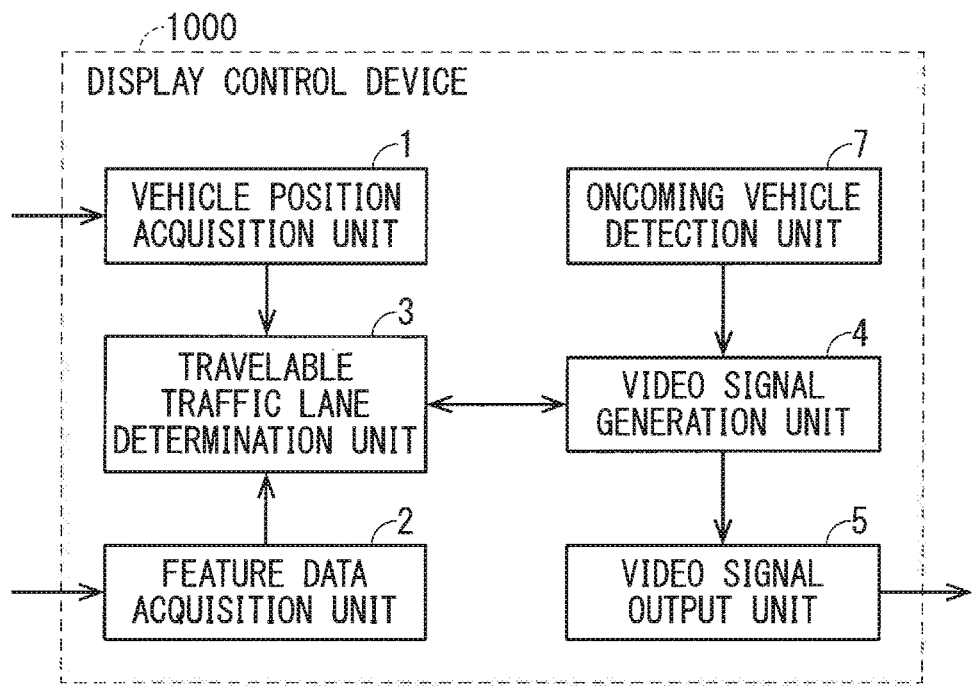
FIG. 20 A block diagram of a display control device according to an embodiment 10.

FIG. 20 is a block diagram of a display control device 1000 in a present embodiment 10. The display control device 1000 further includes an oncoming vehicle detection unit 7. The other configuration in the display control device 1000 is the same as that of the display control device 100 (FIG. 1), thus a description thereof is omitted.

The oncoming vehicle detection unit 7 detects an oncoming vehicle in front of the vehicle. The oncoming vehicle detection unit 7 is achieved by a combination of, for example, an ultrasonic sensor, a camera, a milliwave radar, and a laser radar mounted on the vehicle with the processing circuit HW1 illustrated in FIG. 2 and the processor HW2 and the memory HW3 illustrated in FIG. 3.

Figure 21:
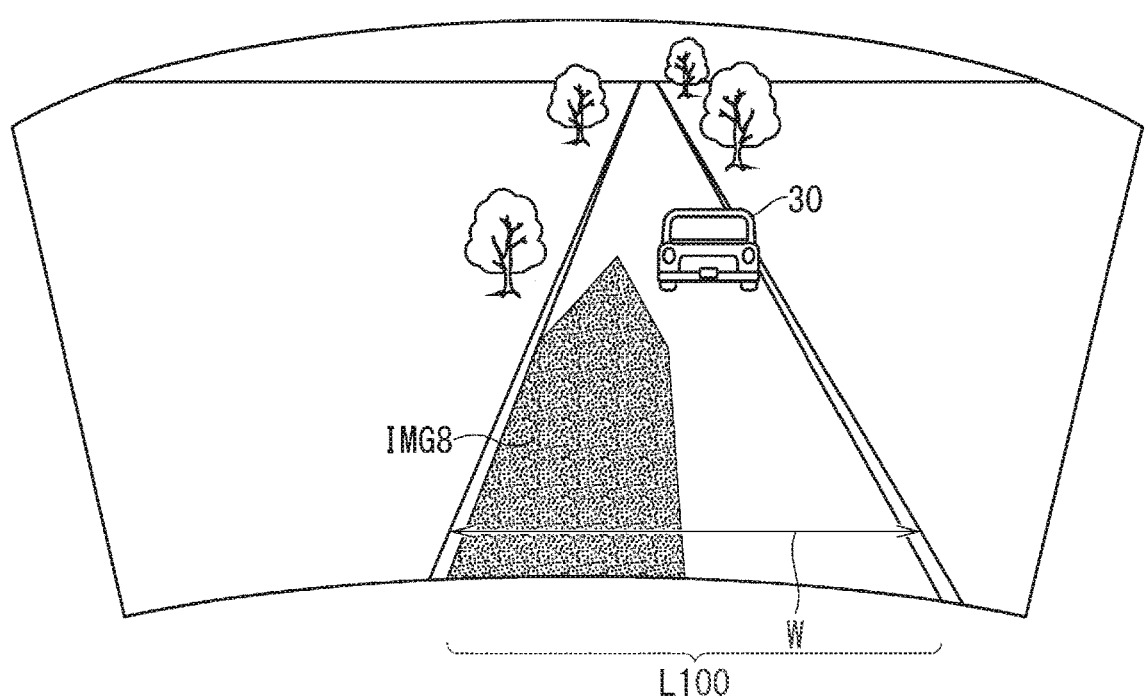
FIG. 21 A pattern diagram illustrating an example of a driver support image which the display control device according to the embodiment 10 makes the display device display and a view from a driver seat in a vehicle.

FIG. 21 is a pattern diagram illustrating an example of the driver support image which the display control device 1000 makes the display device display and a view from a driver seat in a vehicle. As illustrated in FIG. 21, the vehicle currently travels along a traffic lane 100. An oncoming vehicle 30 comes from a front side of the vehicle.

When the oncoming vehicle detection unit 7 of the vehicle traveling along the road L100 detects the oncoming vehicle 30 in front of the vehicle, the video signal generation unit 4 calculates a value obtained by subtracting a width of the vehicle of the video signal generation unit 4 from a width W of the road L100 acquired by the feature data acquisition unit 2. Then, when the calculated value is equal to or smaller than a predetermined value, the video signal generation unit 4 makes the driver support image IMG8 have an overlap with a travelable traffic lane in the road L100, that is to say, a traffic lane along which the vehicle of the video signal generation unit 4 travels. The predetermined value is set using a width of a general vehicle as a standard. The predetermined value is 1.8 meter, for example.

The video signal generation unit 4 temporally changes the density of the driver support image IMG8 having the overlap with the travelable traffic lane in the road L100. The state of temporally changing the density indicates a state of blinking the driver support image IMG8, for example. The color of the driver support image IMG8 may be temporally changed instead of blinking the driver support image IMG8.

<Effect>

The display control device 1000 according to the present embodiment 10 further includes the oncoming vehicle detection unit 7 detecting the oncoming vehicle 30 in front of the vehicle. When the width obtained by subtracting the width of the vehicle from the width of the road along which the vehicle travels has the value equal to or smaller than the predetermined value and the oncoming vehicle is detected in front of the vehicle, the video signal generation unit 4 generates the video signal for displaying the driver support image to have the overlap with the travelable traffic lane in the road along 1.0 which the vehicle travels. The video signal generation unit temporally changes the density or the color of the driver support image.

In the display control device 1000 according to the present embodiment 10, only when the oncoming vehicle is detected in front of the vehicle and there is no sufficient road width to go by the oncoming vehicle, the driver support image is displayed and the density or the color of the image is temporally changed, thus it is possible to effectively attract attention of the user.

The display control devices according to the embodiment 1 to the embodiment 10 described above can be applied not only as the device which can be mounted on the vehicle but also to a display control system constructed as a system in appropriately combination with a communication terminal device and a server device, for example. A mobile communication device is, for example, a mobile phone, a smartphone, and a tablet terminal device.

As described above, when the device mounted on the vehicle, the communication terminal device, and the server device are appropriately combined to construct the display control system, each constituent element of the display control device may be dispersedly disposed in each device constructing the system, or may also be collectively disposed in one of the devices.

A configuration in a case where the constituent elements of the display control device are partially disposed in the server device is described in an embodiment 11 described below. A configuration in a case where the elements included the display control device are partially disposed in the mobile communication device is described in an embodiment 12 described below.

Embodiment 11

Figure 22:
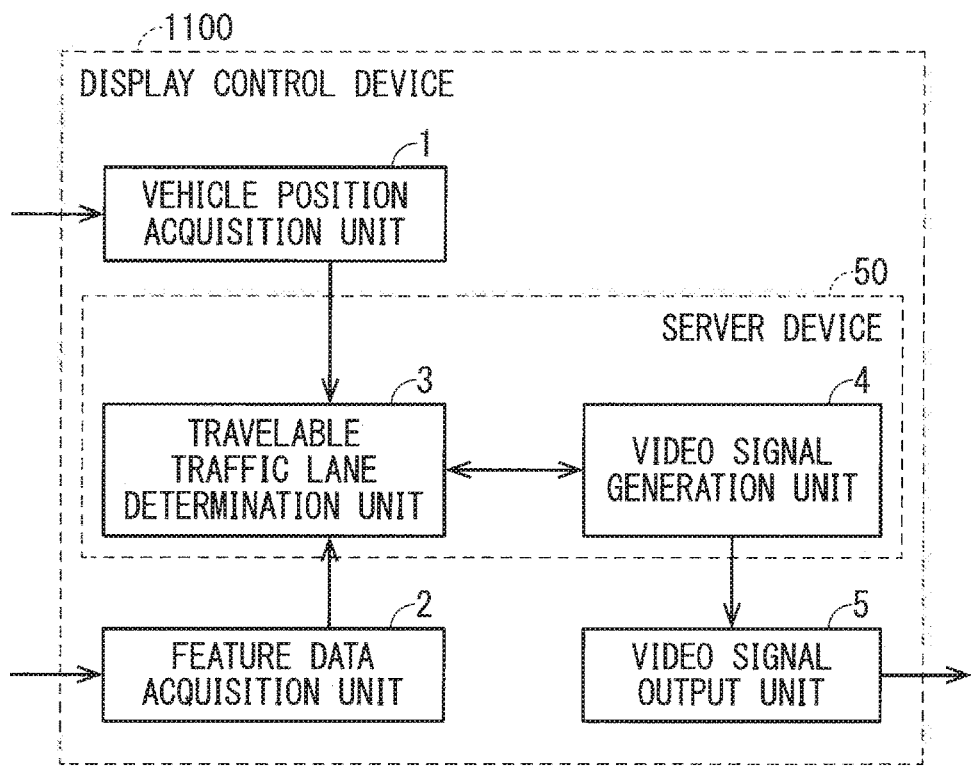
FIG. 22 A block diagram of a display control device according to an embodiment 11.

FIG. 22 is a block diagram of a display control device 1110 in a present embodiment 11. As illustrated in FIG. 22, the display control device 1100 includes a vehicle position acquisition unit 1, a feature data acquisition unit 2, a video signal output unit 5, and a server device 50. The server device 50 includes a travelable traffic lane determination unit 3 and the video signal generation unit 4. The display control device 1100 in the present embodiment 11 includes the same configuration as that of the display control devices (FIG. 1) in the embodiment 1 to the embodiment 8, thus the same reference numerals will be assigned to the same configuration, and a common description is omitted.

The server device 50 communicates with the vehicle position acquisition unit 1, the feature data acquisition unit 2, and the video signal output unit 5 mounted on the vehicle via a communication network such as Internet.

Also applicable is a configuration that the server device 50 includes some or all of the vehicle position acquisition unit 1 and the feature data acquisition unit 2. The display control device 1100 in the present embodiment 11 may have a configuration that each of the obstacle detection unit 6 and the oncoming vehicle detection unit 7 described in the embodiments 9 and 10 is mounted on the vehicle.

Also in the configuration according to the present embodiment 11 in which some of the constituent elements of the display control device 1100 are disposed in the server device 500, the effect similar to the display control devices according to the embodiment 1 to the embodiment 10 described above can be obtained.

Embodiment 12

Figure 23:
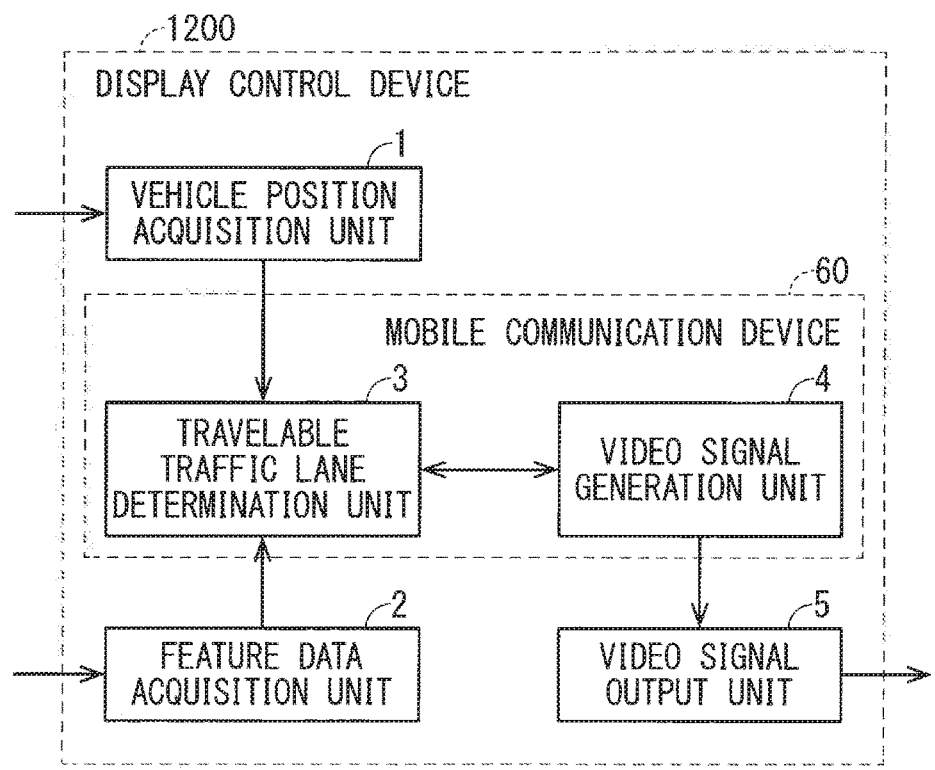
FIG. 23 A block diagram of a display control device according to an embodiment 12.

FIG. 23 is a block diagram of a display control device 1200 in a present embodiment 12. As illustrated in FIG. 23, the display control device 1200 includes a vehicle position acquisition unit 1, a feature data acquisition unit 2, a video signal output unit 5, and a mobile communication device 60. The mobile communication device 60 includes a travelable traffic lane determination unit 3 and the video signal generation unit 4. The display control device 1200 in the present embodiment 12 includes the same configuration as that of the display control devices (FIG. 1) in the embodiment 1 to the embodiment 8, thus the same reference numerals will be assigned to the same configuration, and a common description is omitted.

The mobile communication device 60 communicates with the vehicle position acquisition unit 1, the feature data acquisition unit 2, and the video signal output unit 5 mounted on the vehicle via a communication network such as Internet. The mobile communication device 60 may communicate with the vehicle position acquisition unit 1, the feature data acquisition unit 2, and the video signal output unit 5 mounted on the vehicle via Bluetooth (registered trademark) which is a near field communication standard or a wireless network such as a wireless LAN, for example. The mobile communication device 60 may communicate with the vehicle by wire such as a universal serial bus (USB) cable or a LAN cable.

Also applicable is a configuration that the mobile communication device 60 includes some or all of the vehicle position acquisition unit 1 and the feature data acquisition unit 2. The display control device 1200 in the present embodiment 12 may have a configuration that each of the obstacle detection unit 6 and the oncoming vehicle detection unit 7 described in the embodiments 9 and 10 is mounted on the vehicle.

Also in the configuration according to the present embodiment 12 in which some of the constituent elements of the display control device 1200 are disposed in the mobile communication device 60, the effect similar to the display control devices according to the embodiment 1 to the embodiment 10 described above can be obtained.

According to the present invention, each embodiment can be arbitrarily combined, or each embodiment can be appropriately varied or omitted within the scope of the invention. The present invention has been shown and described in detail, the foregoing description is in all aspects illustrative and not restrictive. It is therefore understood that numerous modifications and variations can be devised without departing from the scope of the invention.

EXPLANATION OF REFERENCE SIGNS

1 vehicle position acquisition unit, 2 feature data acquisition unit, 3 travelable traffic lane determination unit, 4 video signal generation unit, 5 video signal output unit, 6 obstacle detection unit, 7 oncoming vehicle detection unit, 100, 200, 300, 400, 500, 600, 700, 800, 900, 1000, 1100, 1200 display control device, 50 server device, 60 mobile communication device, HW1 processing circuit, HW2 processor, HW3 memory.

The invention claimed is:

1. A display control device for controlling a display device displaying a driver support image to have an overlap with a view from a driver seat in a vehicle or a live-action video in front of the vehicle, the display control device, comprising:
    a processor to execute a program; and
    a memory to store the program which, when executed by the processor, causes the processor to perform processes comprising:
    acquiring a current position of the vehicle and a traffic lane where the vehicle is currently located;
    acquiring feature data including information of a regulation in a traveling direction regarding a road in front of the vehicle;
    determining a travelable traffic lane along which the vehicle can travel in an intersection in front of the vehicle and a road ahead of the intersection or a branch point in front of the vehicle and a road ahead of the branch point based on the current position of the vehicle, a traffic lane where the vehicle is currently located, and the feature data;
    generating a video signal for displaying the driver support image to have an overlap with the travelable traffic lane or a video signal for displaying the driver support image to have an overlap with a region other than the travelable traffic lane; and
    outputting the video signal to the display device, wherein
    the driver support image having the overlap with the travelable traffic lane is an image having a width in a width direction of the traffic lane, extending in a direction in which the traffic lane extends, and linking the traffic lane where the vehicle is currently located and the travelable traffic lane ahead of the intersection or the branch point,
    the driver support image having the overlap with the region other than the travelable traffic lane is an image in which the travelable traffic lane can be distinguished according to a width and a length, and
    when there are a plurality of travelable traffic lanes in the road ahead of intersection or the branch point, the processor generates, in generating the video signal, a video signal for displaying the driver support image to have an overlap with each of the plurality of travelable traffic lanes or a video signal for displaying the driver support image to have an overlap with a region other than the plurality of travelable traffic lanes.

2. The display control device according to claim 1, wherein
    the processor generates a video signal for displaying the driver support image to have the overlap with each of the plurality of travelable traffic lanes in a display form based on a predetermined priority order.

3. The display control device according to claim 2, wherein
    when there are the plurality of travelable traffic lanes in a road straight ahead of the intersection or the branch point, a highest priority order is assigned to a traffic lane located on an extension of the traffic lane where the vehicle is currently located in the plurality of the travelable traffic lanes.

4. The display control device according to claim 2, wherein
    when there are the plurality of travelable traffic lanes in a road after turning left at the intersection or the branch point, a higher priority order is assigned to a traffic lane located closer to a left side in the plurality of the travelable traffic lanes.

5. The display control device according to claim 2, wherein
    when there are the plurality of travelable traffic lanes in a road after turning right at the intersection or the branch point, a higher priority order is assigned to a traffic lane located closer to a right side in the plurality of the travelable traffic lanes.

6. The display control device according to claim 2, wherein
    the driver support image displayed to have the overlap with each of the plurality of travelable traffic lanes is displayed with a deeper color with increase in the predetermined priority order of the travelable traffic lane.

7. The display control device according to claim 2, wherein
    the driver support image displayed to have the overlap with each of the plurality of travelable traffic lanes is displayed with a longer shape with increase in the predetermined priority order of the travelable traffic lane.

8. The display control device according to claim 2, wherein
    the driver support image displayed to have the overlap with each of the plurality of travelable traffic lanes is displayed with a larger width with increase in the predetermined priority order of the travelable traffic lane.

9. The display control device according to claim 2, wherein
    the driver support image is displayed to have the overlap with a traffic lane having the predetermined priority order highest in the plurality of travelable traffic lanes, and an image of an arrow has an overlap with and indicates another travelable traffic lane.

10. The display control device according to claim 1, wherein
    the processor can switch between a setting of making the driver support image have the overlap with the travelable traffic lane and a setting of making the driver support image have the overlap with the region other than the travelable traffic lane.

11. The display control device according to claim 1, wherein
the processor generates a video signal for displaying a mark indicating no-entry to have an overlap with a road which the vehicle is restricted from entering from the travelable traffic lane in addition to the overlap of the driver support image.

12. The display control device according to claim 1, wherein
when the processor acquires data indicating that the road in front of the vehicle has an overlap with a track of a light rail line or a trolleybus, the processor generates a video signal for displaying the driver support image to have an overlap with the travelable traffic lane.

13. The display control device according to claim 1, wherein
at least one setting of a density, a color, and a pattern of the driver support image can be changed in accordance with an operation of a user.

14. A display control method for controlling a display device displaying a driver support image to have an overlap with a view from a driver seat in a vehicle or a live-action video in front of the vehicle, the display control method comprising:
acquiring a current position of the vehicle and a traffic lane where the vehicle is currently located;
acquiring feature data including information of a regulation in a traveling direction regarding a road in front of the vehicle;
determining a travelable traffic lane along which the vehicle can travel in an intersection in front of the vehicle and a road ahead of the intersection or a branch point in front of the vehicle and a road ahead of the branch point based on the current position of the vehicle, a traffic lane where the vehicle is currently located, and the feature data;
generating a video signal for displaying the driver support image to have an overlap with the travelable traffic lane or a video signal for displaying the driver support image to have an overlap with a region other than the travelable traffic lane; and
outputting the video signal to the display device, wherein
the driver support image having the overlap with the travelable traffic lane is an image having a width in a width direction of the traffic lane, extending in a direction in which the traffic lane extends, and linking the traffic lane where the vehicle is currently located and the travelable traffic lane ahead of the intersection or the branch point,
the driver support image having the overlap with the region other than the travelable traffic lane is an image in which the travelable traffic lane can be distinguished according to a width and a length, and
when there are a plurality of travelable traffic lanes in the road ahead of intersection or the branch point, generated in generating the video signal is a video signal for displaying the driver support image to have an overlap with each of the plurality of travelable traffic lanes or a video signal for displaying the driver support image to have an overlap with a region other than the plurality of travelable traffic lanes.

* * * * *